US011245814B2

(12) United States Patent
Kato

(10) Patent No.: US 11,245,814 B2
(45) Date of Patent: *Feb. 8, 2022

(54) SHARED TERMINAL TRANSMITS PRINT DATA WITH NAME OF THE SHARED TERMINAL AS A PRINT REQUESTER TO PRINTER WHEN THE TERMINAL DEVICE IDENTIFICATION IS NOT RECEIVED

(71) Applicant: Ricoh Company, Ltd., Tokyo (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,381

(22) Filed: Sep. 14, 2020

(65) Prior Publication Data
US 2020/0412910 A1 Dec. 31, 2020

Related U.S. Application Data

(63) Continuation of application No. 15/656,055, filed on Jul. 21, 2017, now Pat. No. 10,791,246.

(30) Foreign Application Priority Data
Jul. 25, 2016 (JP) .............................. 2016-145399

(51) Int. Cl.
*H04N 1/44* (2006.01)
*H04N 1/00* (2006.01)
(Continued)

(52) U.S. Cl.
CPC ....... *H04N 1/4433* (2013.01); *H04N 1/00106* (2013.01); *H04N 1/00228* (2013.01);
(Continued)

(58) Field of Classification Search
None
See application file for complete search history.

(56) References Cited

U.S. PATENT DOCUMENTS 8,610,935 B1 * 12/2013 McKinley ............. G06F 3/1267
358/1.15
2012/0060197 A1   3/2012 Kemmochi
(Continued)

FOREIGN PATENT DOCUMENTS

JP   2007-213123 A   8/2007
JP   2011-201205 A   10/2011
(Continued)

OTHER PUBLICATIONS

Japanese Office Action dated Mar. 13, 2020, issued in corresponding Japanese Patent Application No. 2016-145399 (dispatch No. 105665), 3 pages.
(Continued)

*Primary Examiner* — Haris Sabah
(74) *Attorney, Agent, or Firm* — Xsensus LLP

(57) ABSTRACT

An apparatus, system, and method of controlling transmission of an image, each of which: displays, on a display, an image to a plurality of users, the plurality of users sharing a use of the shared terminal; obtains, from a first privately-owned terminal owned by a first user of the plurality of users, first terminal identification information for identifying the first privately-owned terminal; transmits an authentication request for authenticating the first privately-owned terminal to a terminal management server, the authentication request including the first terminal identification information of the first privately-owned terminal; receives an authentication result of authenticating the first privately-owned terminal from the terminal management server; and when the authentication result indicates that the first privately-owned terminal is a legitimate terminal, and transmits a print
(Continued)

request for printing data relating to the image being displayed to a printer through a network.

20 Claims, 21 Drawing Sheets

(51) Int. Cl.
  *H04N 1/32* (2006.01)
  *G06F 3/14* (2006.01)
  *G06F 3/12* (2006.01)

(52) U.S. Cl.
  CPC ..... *H04N 1/00233* (2013.01); *H04N 1/00344* (2013.01); *H04N 1/32117* (2013.01); *H04N 1/32529* (2013.01); *H04N 1/4426* (2013.01); *G06F 3/1272* (2013.01); *G06F 3/1454* (2013.01); *H04N 2201/006* (2013.01); *H04N 2201/0039* (2013.01); *H04N 2201/0094* (2013.01); *H04N 2201/3205* (2013.01)

(56) References Cited

U.S. PATENT DOCUMENTS

| | | | | |
|---|---|---|---|---|
| 2013/0047190 A1* | 2/2013 | Suzuki | ............... | H04N 1/32776 |
| | | | | 725/86 |
| 2014/0033050 A1 | 1/2014 | Shin et al. | | |
| 2014/0365927 A1 | 12/2014 | Sakai | | |
| 2015/0092233 A1 | 4/2015 | Park et al. | | |
| 2015/0277844 A1* | 10/2015 | Kubota | ................ | H04N 9/3179 |
| | | | | 345/2.1 |
| 2015/0339561 A1 | 11/2015 | Takenaka | | |
| 2016/0142565 A1* | 5/2016 | Kida | ................... | H04N 1/00938 |
| | | | | 358/1.15 |
| 2016/0163013 A1* | 6/2016 | Arai | ........................ | H04L 67/10 |
| | | | | 715/753 |
| 2016/0165180 A1 | 6/2016 | Kato et al. | | |
| 2016/0294571 A1 | 10/2016 | Kato et al. | | |
| 2016/0295162 A1 | 10/2016 | Kato | | |
| 2016/0295354 A1 | 10/2016 | Kato et al. | | |
| 2016/0295626 A1 | 10/2016 | Kato et al. | | |
| 2016/0309532 A1 | 10/2016 | Yu et al. | | |
| 2016/0352787 A1 | 12/2016 | Kato | | |
| 2016/0366371 A1 | 12/2016 | Kato et al. | | |
| 2017/0080643 A1 | 3/2017 | Kato et al. | | |
| 2019/0146745 A1* | 5/2019 | Kato | ....................... | H04W 4/80 |
| | | | | 709/206 |

FOREIGN PATENT DOCUMENTS

| | | |
|---|---|---|
| JP | 2012-048610 | 3/2012 |
| JP | 2014-106843 | 6/2014 |
| JP | 2015-029175 A | 2/2015 |
| JP | 2015-192251 A | 11/2015 |

OTHER PUBLICATIONS

Office Action dated Oct. 19, 2021 in Japanese Patent Application No. 2020-117456, 3 pages.

* cited by examiner

FIG. 12A

| TERMINAL ID | USER NAME |
|---|---|
| aaa | Kato |
| bbb | Jim |
| . . . | . . . |

FIG. 12B

| USER NAME (PRINT REQUESTER NAME) | FILE NAME | PRINT CONFIGURATION PARAMETER |
|---|---|---|
| Kato | 1001 | COLOR, A4, · · · |
| Kato | 1002 | MONOCHROME, A4, · · · |
| Jim | 2001 | COLOR, A3, · · · |
| . . . | . . . | . . . |

SHARED TERMINAL TRANSMITS PRINT DATA WITH NAME OF THE SHARED TERMINAL AS A PRINT REQUESTER TO PRINTER WHEN THE TERMINAL DEVICE IDENTIFICATION IS NOT RECEIVED

CROSS-REFERENCE TO RELATED APPLICATIONS

This patent application is a continuation of U.S. application Ser. No. 15/656,055, filed Jul. 21, 2017, which is based on and claims priority pursuant to 35 U.S.C. § 119(a) to Japanese Patent Application No. 2016-145399, filed on Jul. 25, 2016, in the Japan Patent Office, the entire disclosure of each is hereby incorporated by reference herein.

TECHNICAL FIELD

The present invention relates to a shared terminal, communication system, image transmission method, and recording medium.

DESCRIPTION OF THE RELATED ART

Recently, electronic whiteboards are disposed in various types of places such as meeting rooms in companies or classrooms in educational institutions. The electronic whiteboard is provided with a touch panel display of large size, on which each user draws an image with an electronic pen or his or her finger. The image drawn by each user is displayed to a plurality of users in the same room. Through sharing the image between the users, a meeting or a lecture can be conducted more smoothly.

SUMMARY

Example embodiments of the present invention include an apparatus, system, and method of controlling transmission of an image, each of which: displays, on a display, an image to a plurality of users, the plurality of users sharing a use of the shared terminal; obtains, from a first privately-owned terminal owned by a first user of the plurality of users, first terminal identification information for identifying the first privately-owned terminal; transmits an authentication request for authenticating the first privately-owned terminal to a terminal management server, the authentication request including the first terminal identification information of the first privately-owned terminal; receives an authentication result of authenticating the first privately-owned terminal from the terminal management server; and when the authentication result indicates that the first privately-owned terminal is a legitimate terminal, transmits a print request for printing data relating to the image being displayed to a printer through a network.

Example embodiments of the present invention include a non-transitory recording medium storing an image transmission control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 12A is a conceptual diagram illustrating a terminal management table, according to an embodiment;

FIG. 12B is a conceptual diagram illustrating a print data management table, according to an embodiment.

Figure 1:
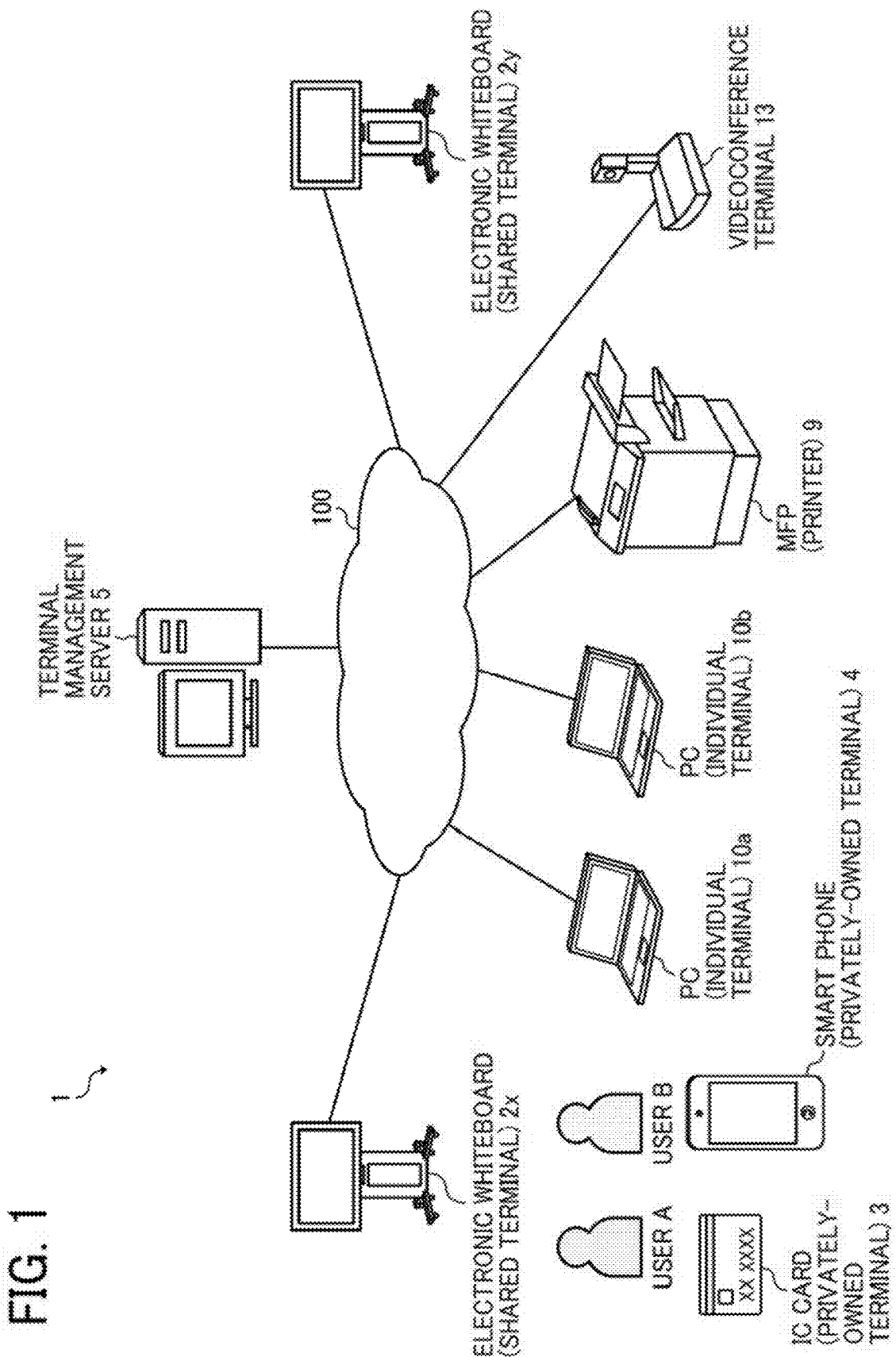
FIG. 1 is a schematic diagram illustrating a communication system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, a communication system 1 is described in detail according to embodiments.

<Overview of System Configuration>

First, an overview of a configuration of the communication system 1 is described according to an embodiment. FIG. 1 is a schematic diagram illustrating a configuration of the communication system 1 according to the embodiment.

As illustrated in FIG. 1, the communication system 1 of the embodiment includes an electronic whiteboard 2x, an electronic whiteboard 2y, an IC card 3, a smart phone 4, a terminal management server 5, an MFP 9, PCs 10a and 10b, and a videoconference terminal 13. For simplicity, in the following, any arbitrary one of the electronic whiteboards 2x and 2y is referred to as the "electronic whiteboard 2". Any arbitrary one of the PCs 10a and 10b is referred to as the "PC 10".

The electronic whiteboard 2, the terminal management server 5, the destination management server 6, the mail server 7, the print server 8, the MFP 9, the PC 10, and the videoconference terminal 13 are communicable with one another through a communication network 100. The communication network 100 is implemented by the Internet, mobile communication network, local area network (LAN), etc. The communication network 100 may include, in addition to a wired network, a wireless network in compliance with such as 3rd Generation (3G), Worldwide Interoperability for Microwave Access (WiMAX), Long Term Evolution (LTE), etc. The electronic whiteboard 2, IC card 3, and smart phone 4 are communicable with one another using a near-distance communication technology in compliance with such as Near Field Communication (NFC) (Registered Trademark). The smart phone 4 may communicate with the electronic whiteboard 2 using the near-distance communication technology in compliance with such as Bluetooth (Registered Trademark).

One of the electronic whiteboard 2a and the electronic whiteboard 2b transmits or receives drawing image data representing a content drawn by a user ("drawing image data"), to or from the other one of the electronic whiteboard 2a and the electronic whiteboard 2b. That is, the content drawn at the electronic whiteboard 2a is displayed at the electronic whiteboard 2b, and the content drawn at the electronic whiteboard 2b is displayed at the electronic whiteboard 2a.

The electronic whiteboard 2 generates image data in Refined Printing Command Stream (PRCS) based on the drawing image data, and transmits the generated image data to the MFP 9 through the communication network 100. The MFP 9 prints a drawing image based on the image data received from the electronic whiteboard 2. In another example, the electronic whiteboard 2 generates image data in Portable Document Format (PDF) based on the drawing image data, and transmits an electronic mail attached with the generated image data to the PC 10 through the communication network 100. The PC 10 displays a drawing image based on the image data extracted from the electronic mail.

The electronic whiteboard 2 may display an image other than the drawing image drawn by the user ("non-drawing image"), such as an image of a presentation material. The electronic whiteboard 2 generates image data in PRCS based on non-drawing image data, and transmits the generated image data to the MFP 9 through the communication network 100. In another example, the electronic whiteboard 2 generates image data in PDF based on the non-drawing image data, and transmits an electronic mail attached with the generated image data to the PC 10 through the communication network 100.

In this disclosure, the image data in PRCS and the image data in PDF each represent a content of a drawing image drawn by a user, or a non-drawing image displayed by a user, for example. The electronic whiteboard 2 is an example of a shared terminal to be shared by a plurality of users, such that the plurality of users can view the same image at a same time. The IC card 3 and the smart phone 4 are an example of a privately-owned terminal, privately owned by each user. Preferably, the privately-owned terminal is a portable terminal, which is easily carried with the user, such as to the meeting. The MFP 9 is an example of a printer. The PC 10 is an example of an individual terminal operated by an individual user. Examples of the PC 10 include a desktop PC, a notebook PC, and a tablet. In this disclosure, the individual terminal is a terminal that is operated by the user such as a terminal owned by the user. The PC 10 does not have to be brought to the meeting, as long as the user is able to access his or her email address using the PC 10.

Further, the image data may be generated not only in PRCS, but in any other desired format such as a printer control language (PCL), page description language (PDL), or Post Script (PS).

In FIG. 1, the user A, who owns the IC card 3, brings the IC card 3 to a meeting being held with the electronic whiteboard 2. The user B, who owns the smart phone 4, brings the smart phone 4 to the meeting being held with the electronic whiteboard 2. The PC 10a is any PC owned by the user A. The PC 10b is any PC owned by the user B. In one example, the electronic whiteboard 2 may have a videoconference capability, to carry out a videoconference with the videoconference terminal 13 by communicating video data and audio data through the communication network 100. Further, the electronic whiteboard 2 sends drawing image data reflecting a content drawn by the user A or B, to the MFP 9 through the communication network 100, to cause the MFP 9 to print an image based on the drawing image data.

The terminal management server 5 manages, for each user, a user name identifying the user in association with a terminal ID of the terminal that is privately owned by the user.

<Hardware Configuration>

Referring to FIGS. 2 to 7, a hardware configuration of the apparatus or terminal in the communication system 1 is described according to the embodiment.

<Hardware Configuration of Electronic Whiteboard>

Figure 2:
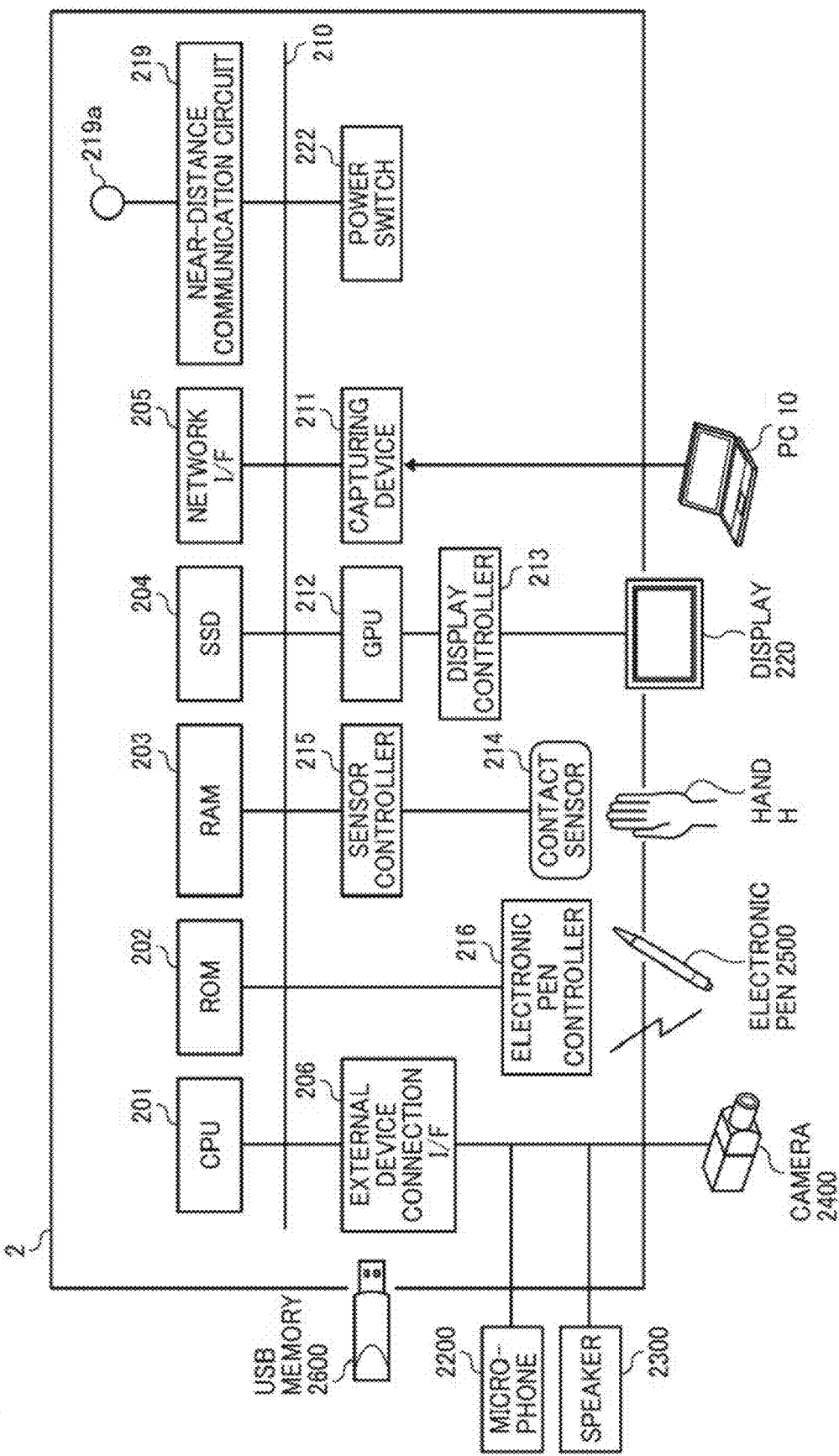
FIG. 2 is a schematic block diagram illustrating a hardware configuration of an electronic whiteboard, according to an embodiment.

FIG. 2 is a diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 2. The ROM 202 stores a control program for operating the CPU 201 such as an Initial Program Loader (IPL). The RAM 203 is used as a work area for the CPU 201. The SSD 204 stores various data such as the control program for the electronic whiteboard 2. The network I/F 205 controls communication with an external device through the communication network 100. The external device connection I/F 206 controls communication with a USB memory 2600, and external devices such as a camera 2400, a speaker 2300, a microphone 2200, etc.

The electronic whiteboard 2 further includes a capturing device 211, a graphics processing unit (GPU) 212, a display controller 213, a contact sensor 214, a sensor controller 215, an electronic pen controller 216, a near-distance communication circuit 219, an antenna 219a for the near-distance communication circuit 219, and a power switch 222.

The capturing device 211 causes a display 508 of the PC 10 to display a still image or a video image based on image data that is captured by the capturing device 211. The GPU 212 is a semiconductor chip dedicated to processing a graphical image. The display controller 213 controls display of an image processed at the GPU 212 for output through a display 220 provided with the electronic whiteboard 2. The contact sensor 214 detects a touch onto the display 220 with an electronic pen 2500 or a user's hand H. The sensor controller 215 controls operation of the contact sensor 214. The contact sensor 715 senses a touch input to a specific coordinate on the display 220 using the infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the pen 15 to the display 220. The near-distance communication circuit 219 is a communication circuit that communicates in compliance with the NFC, the Bluetooth, and the like.

The power switch 222 turns on or off the power of the electronic whiteboard 2.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the pen 15, the electronic pen controller 216 may also detect a touch by another part of the electronic pen 2500, such as a part held by a hand of the user.

<Hardware Configuration of IC Card>

Figure 3:
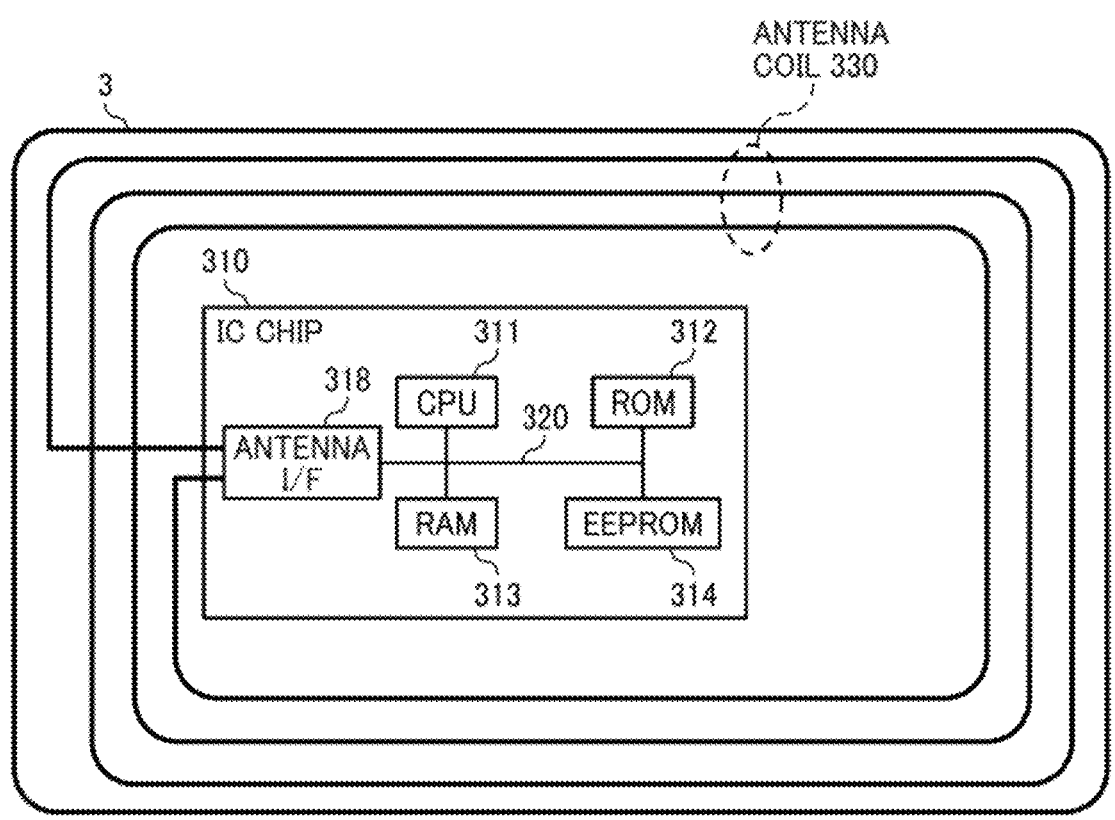
FIG. 3 is a schematic block diagram illustrating a hardware configuration of an integrated circuit (IC) card, according to an embodiment.

FIG. 3 is a diagram illustrating a hardware configuration of the IC card 3 according to the embodiment. In this disclosure, the contactless IC card is described, but contact IC card may be applied instead. As illustrated in FIG. 3, the IC card 3 includes an IC chip 310 and an antenna coil 330. The IC card 3 further includes a CPU 311, a ROM 312, a RAM 313, an Electrically Erasable and Programmable ROM (EEPROM) 314, and an antenna I/F 318.

The CPU 311 controls entire operation of the IC card 3. The ROM 312 stores a control program for operating the CPU 311. The RAM 313 is used as a work area for the CPU 311. The EEPROM 314 stores various data such as the control program for the IC card 3, and terminal ID for identifying the IC card 3, and the like. The antenna I/F 318 controls transmission or reception of data with an external device via the antenna coil 330.

The IC card 3 further includes a bus line 320. The bus line 320 is an address bus or a data bus, which electrically connects the elements in FIG. 3 such as the CPU 311.

The antenna coil 330 generates an electric current, which is induced as the IC card 3 passes an electromagnetic field generated by radio waves emitted from an external device such as a reader and writer. The IC card 3 uses the generated electric current to activate the IC chip 310, and communicates with the external device, that is the reader and writer, to obtain or provide data with the external device.

<Hardware Configuration of Smart Phone>

Figure 4:
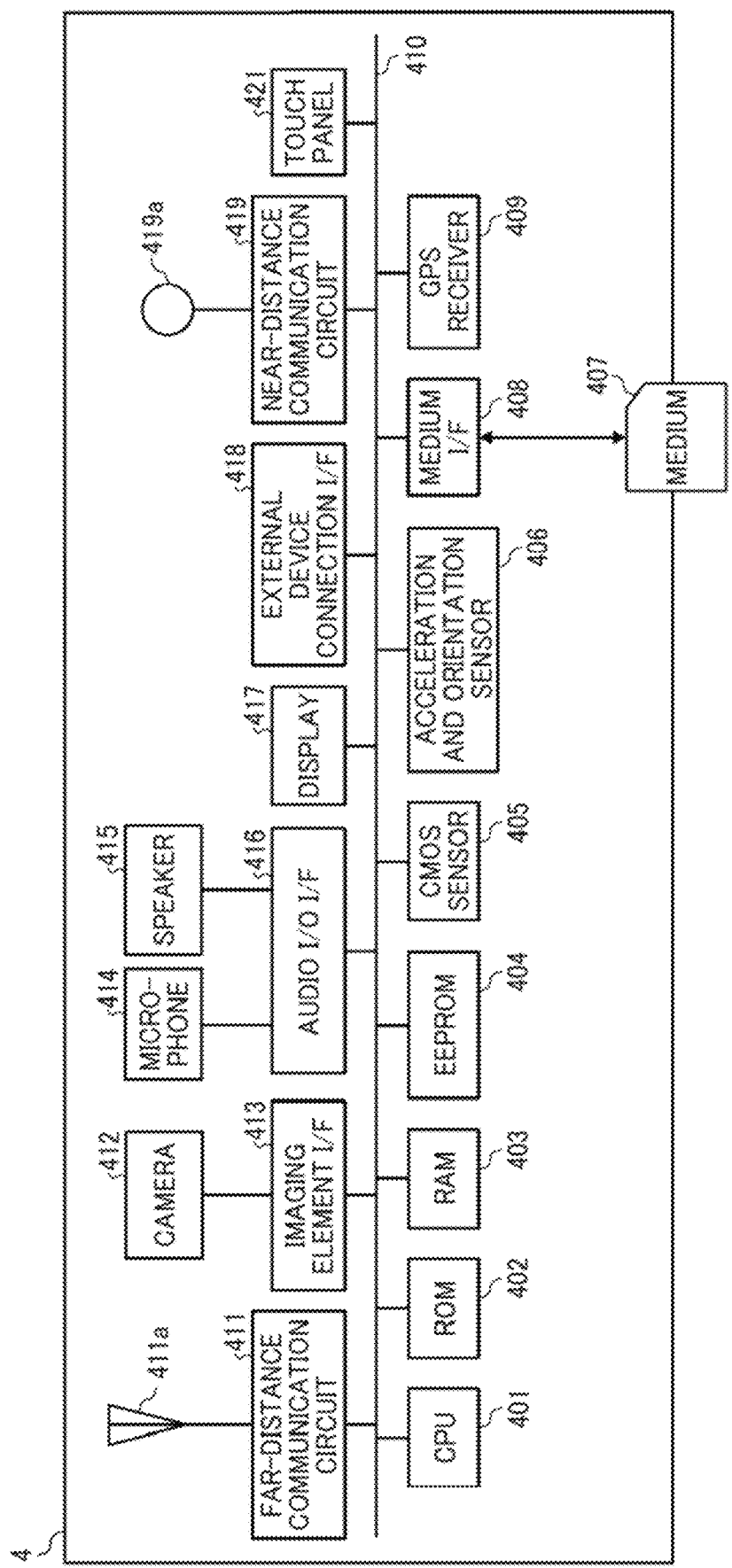
FIG. 4 is a schematic block diagram illustrating a hardware configuration of a smart phone, according to an embodiment.

FIG. 4 is a diagram illustrating a hardware configuration of the smart phone 4 according to the embodiment. As illustrated in FIG. 4, the smart phone 4 includes a CPU 401, a ROM 402, a RAM 403, an EEPROM 404, a Complementary Metal Oxide Semiconductor (CMOS) sensor 405, an acceleration and orientation sensor 406, a medium I/F 408, and a GPS receiver 409.

The CPU 401 controls entire operation of the smart phone 4. The ROM 402 stores a control program for controlling the CPU 401 such as an IPL. The RAM 403 is used as a work area for the CPU 401. The EEPROM 404 reads or writes various data such as a control program for the smart phone 4 under control of the CPU 401. The CMOS sensor 405 captures an object (mainly, the user operating the smart phone 4) under control of the CPU 401 to obtain captured image data. The acceleration and orientation sensor 406 includes various sensors such as an electromagnetic compass or gyrocompass for detecting geomagnetism, and an acceleration sensor. The medium I/F 408 controls reading or writing of data with respect to a recording medium 407 such as a flash memory. The GPS receiver 409 receives a GPS signal from a GPS satellite.

The smart phone 4 further includes a far-distance communication circuit 411, a camera 412, an imaging element I/F 413, a microphone 414, a speaker 415, an audio input/output I/F 416, a display 417, an external device connection I/F 418, a near-distance communication circuit 419, an antenna 419a for the near-distance communication circuit 419, and a touch panel 421.

The far-distance communication circuit 411 is a circuit that communicates with other device through the communication network 100. The camera 412 is an example of imaging device capable of capturing a subject under control of the CPU 401, and is incorporated in the smart phone 4. The imaging element I/F 413 is a circuit that controls driving of the camera 412. The microphone 414 is an example of audio collecting device capable of inputting audio under control of the CPU 401, and is incorporated in the smart phone 4. The audio I/O I/F 416 is a circuit for inputting or outputting an audio signal between the microphone 414 and the speaker 415 under control of the CPU 401. The display 417 may be a liquid crystal or organic electro luminescence (EL) display that displays an image of a subject, an operation icon, or the like. The external device I/F 418 is an interface circuit that connects the smart phone 4 to various external devices. The near-distance communication circuit 419 is a communication circuit that communicates in compliance with the NFC, the Bluetooth, and the like. The touch panel 421 is an example of input device that enables the user to input a user instruction through touching a screen of the display 417.

The smart phone 4 further includes a bus line 410. The bus line 410 is an address bus or a data bus, which electrically connects the elements in FIG. 4 such as the CPU 401.

<Hardware Configuration of Server and PC>

Figure 5:
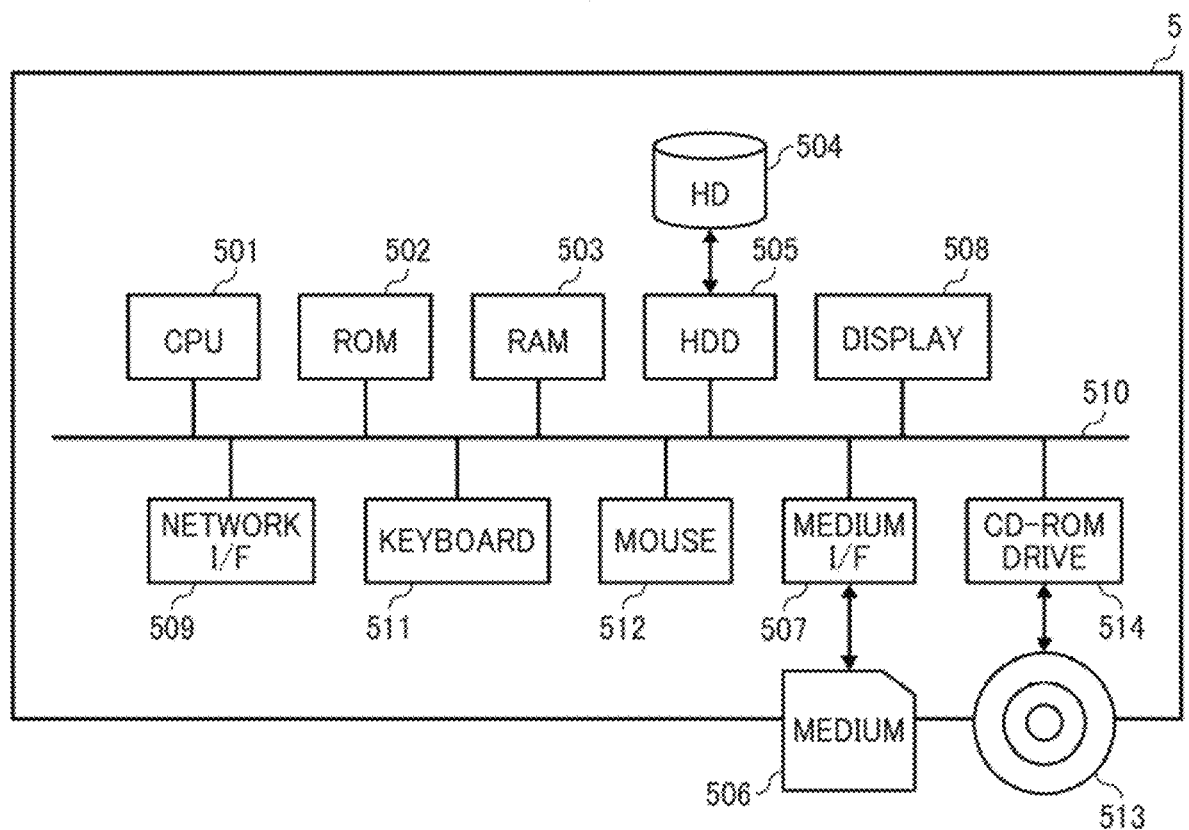
FIG. 5 is a schematic block diagram illustrating a hardware configuration of a personal computer (PC), according to an embodiment.

FIG. 5 is a diagram illustrating a hardware configuration of the server and the PC, according to the embodiment. In this disclosure, since the terminal management server 5, PC 10a, and PC 10b have a substantially the same hardware structure, a hardware configuration of the terminal management server 5 is described below as an example. In the following description, even in case of describing the hardware configuration of the PC 10a and PC 10b, the elements in FIG. 5 are referred.

As illustrated in FIG. 5, the terminal management server 5, which may be implemented by a computer, includes a CPU 501, a ROM 502, a RAM 503, a hard disk (HD) 504, a hard disk drive (HDD) 505, a recording medium 506, a medium I/F 507, a display 508, a network I/F 509, a keyboard 511, a mouse 512, a CD-ROM drive 514, and a bus line 510. Since the terminal management server 5 operates as a server, an input device such as the keyboard 511 and the mouse 512, or an output device such as the display 508 does not have to be provided.

The CPU 501 controls entire operation of the terminal management server 5. The ROM 502 stores a control program for controlling the CPU 501 such as an IPL. The RAM 503 is used as a work area for the CPU 501. The HD 504 stores various data such as a control program. The HDD 505 controls reading or writing of various data to or from the HDD 504 under control of the CPU 501. The medium I/F 507 controls reading or writing of data with respect to a recording medium 506 such as a flash memory. The display 508 displays various information such as a cursor, menu, window, characters, or image. The network I/F 509 is an interface that controls communication of data with an external device through the communication network 100. The keyboard 511 is one example of input device provided with a plurality of keys for allowing a user to input characters, numerals, or various instructions. The mouse 512 is one example of input device for allowing the user to select a specific instruction or execution, select a target for processing, or move a curser being displayed. The CD-ROM drive 514 reads or writes various data with respect to a Compact Disc ROM (CD-ROM) 513, which is one example of removable recording medium.

The terminal management server 5 further includes a bus line 510. The bus line 510 may be an address bus or a data bus, which electrically connects various elements such as the CPU 501 of FIG. 5.

<Hardware Configuration of MFP>

Figure 6:
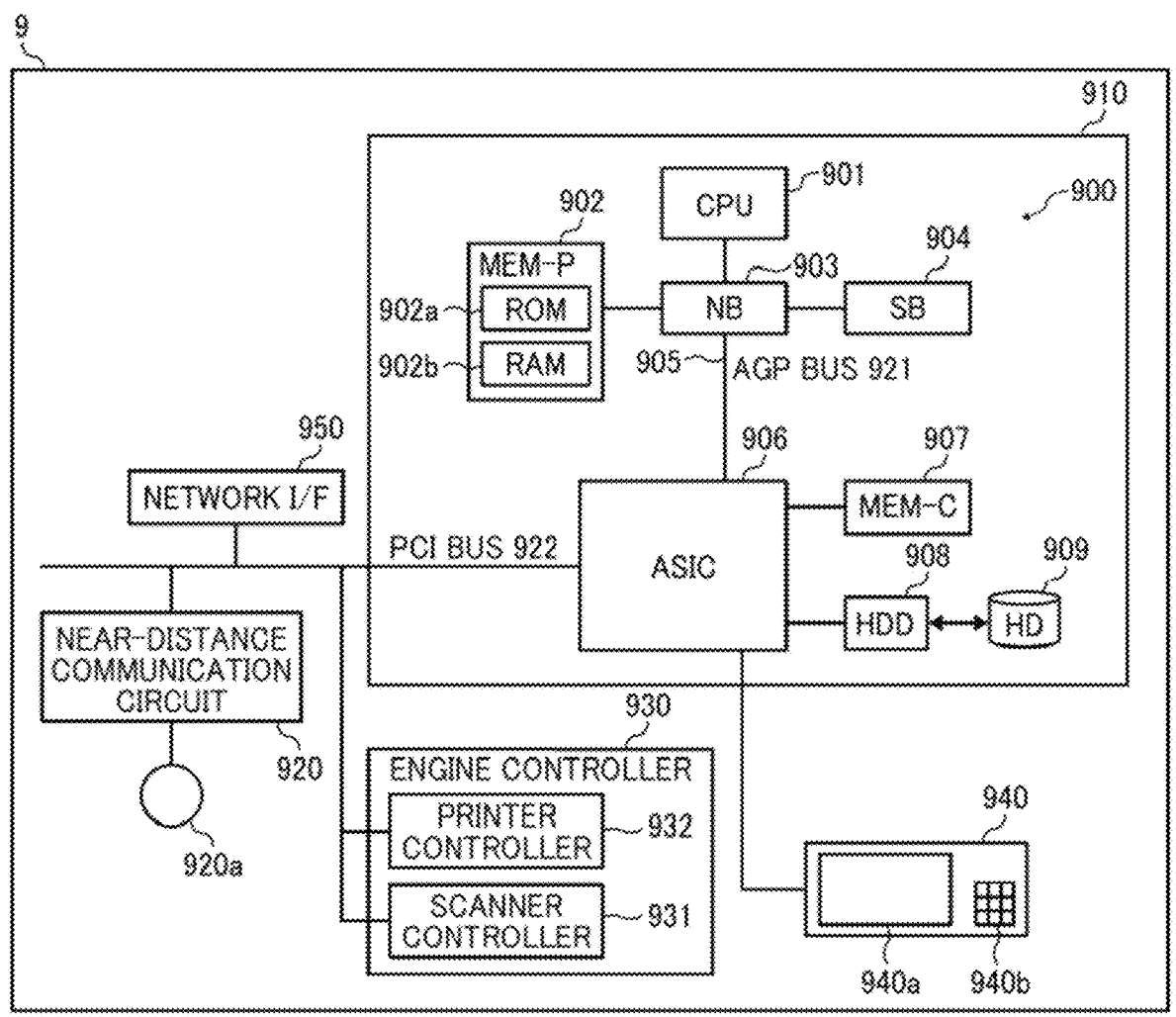
FIG. 6 is a schematic block diagram illustrating a hardware configuration of a multifunctional peripheral (MFP), according to an embodiment.

FIG. 6 is a diagram illustrating a hardware configuration of the MFP 9, according to the embodiment. As illustrated in FIG. 6, the MFP 9 includes a controller 901, a near-distance communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, a HDD 908, and a HD 909. The NB 903 and the ASIC 906 are connected through an Accelerated Graphics Port (AGP) bus 921.

The CPU 901 controls entire operation of the MFP 9. The NB 903 connects the CPU 901, with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for achieving various functions of the controller 910. The MEM-P 902 further includes a RAM 902b as a memory that deploys the program and data, or as a drawing memory that stores drawing data for printing. The program stored in the RAM 902b may be stored in any computer-readable recording medium, such as a CD-ROM, floppy disk (FD), CD-R, or DVD, in a file format installable and executable by the computer, for distribution.

The SB 904 connects the NB 903 with a PCI bus 922 or a peripheral device. The ASIC 906 is an integrated circuit (IC) privately-owned to image processing, and connects the AGP bus 905, PCI bus 922, HDD 908, and MEM-C 907. The ASIC 906 includes a PCI target, an AGP master, an arbiter (ARB) as a central processor, a memory controller for controlling the MEM-C 907, a plurality of direct memory access controllers (DMACs) capable of converting coordinates of image data with a hardware logic, and a PCI unit that transfers data between the scanner controller 931 and the printer controller 932 through the PCI bus 922. The ASIC 906 may be connected to a Universal Serial Bus (USC) interface, or the Institute of Electrical and Electronics Engineers 1394 (IEEE1394) interface.

The MEM-C 907 is a local memory, which is used as a buffer for image data to be printed or code image. The HD 909 stores various image data, font data for printing, and form data. The HDD 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, processes by the AGP bus 921 can be accelerated.

The near-distance communication circuit 920 is provided with an antenna 920a for the near-distance communication circuit 920. The near-distance communication circuit 920 is a communication circuit that communicates in compliance with the NFC, the Bluetooth, and the like.

The engine controller 930 includes a scanner controller 931 and a printer controller 932. The control panel 940 includes a display 940a and various keys 940b. The control panel 940 displays current settings or a selection screen, and is provided with a touch panel for receiving a user input. The keys 940b, which include such as a ten key and a Start key, are used by the user to enter set values of various image forming parameters such as image density parameter. The controller 910 controls entire operation of the MFP 9. In example operation, the controller 910 controls drawing, communication, or user inputs to the control panel 940. The scanner controller 931 and the printer controller 932 each perform various image processing, such as error diffusion or gamma conversion.

In response to an instruction to select a specific application through the control panel 940, for example, using a mode switch key, the MFP 9 selectively performs a document box function, copy function, print function, and facsimile function. When the document box function is selected, the MFP 9 changes its operating mode to a document box mode to store document data. With selection of the copy function, the MFP 90 operates in a copy mode. With selection of the print function, the MFP 9 operates in a printer mode. With selection of the facsimile function, the MFP 9 operates in a facsimile mode.

The network I/F 950 controls communication of data with an external device through the communication network 100. The near-distance communication circuit 920 and the network I/F 950 are electrically connected to the ASIC 906 via the PCI bus 922.

<Hardware Configuration of Videoconference Terminal>

Figure 7:
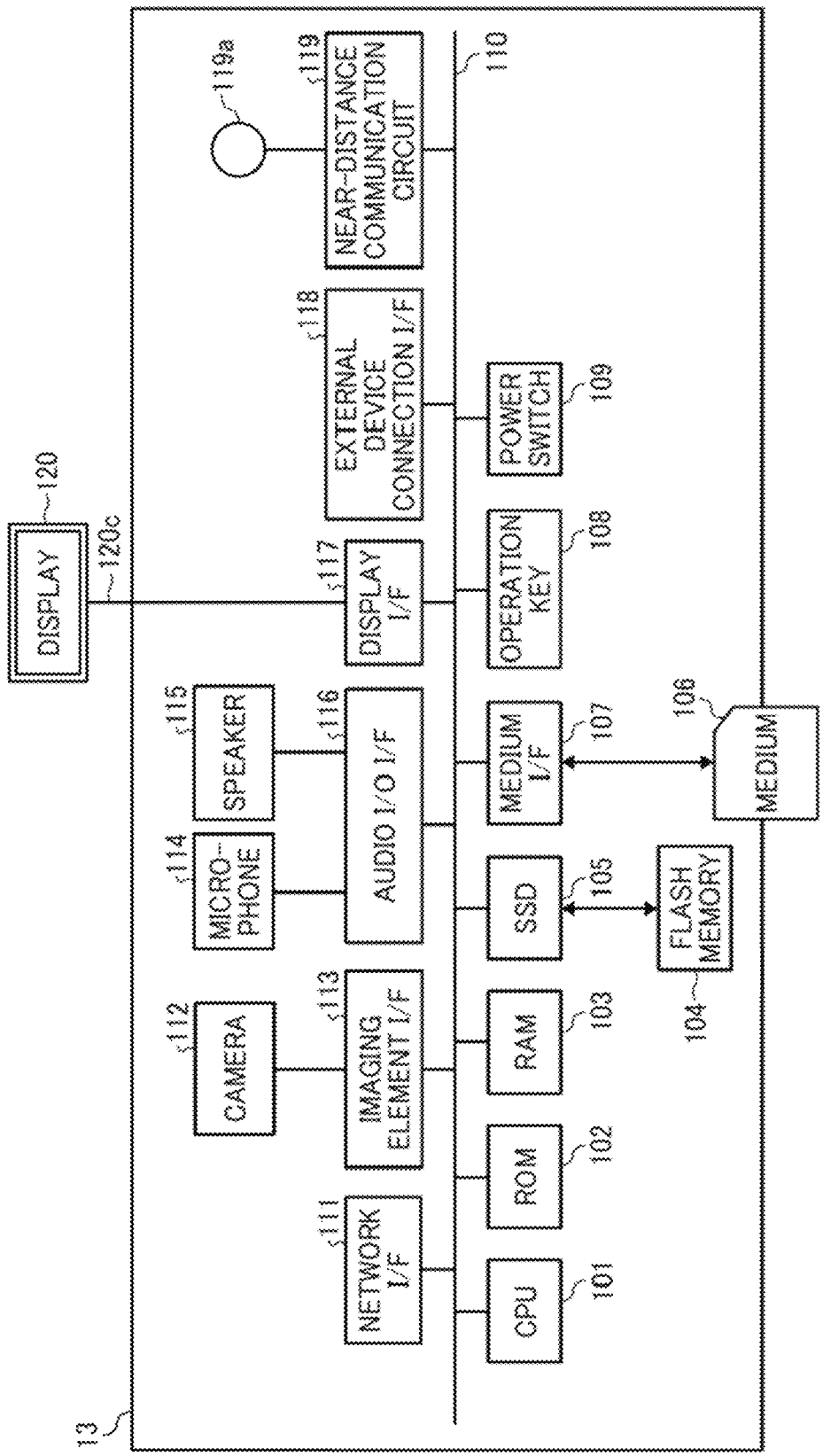
FIG. 7 is a schematic block diagram illustrating a hardware configuration of a videoconference terminal, according to an embodiment.

FIG. 7 is a diagram illustrating a hardware configuration of the videoconference terminal 13 according to the embodiment. As illustrated in FIG. 7, the videoconference terminal 13 includes a CPU 101, a ROM 102, a RAM 103, a flash memory 104, a SSD 105, a medium I/F 107, an operation key 108, a power switch 109, a bus line 110, a network I/F 111, a camera 112, an imaging element I/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the videoconference terminal 13. The ROM 102 stores a control program for controlling the CPU 101 such as an IPL. The RAM 103 is used as a work area for the CPU 101. The flash memory 104 stores various data such as a communication control program, image data, and audio data. The SSD 105 controls reading or writing of various data to or from the flash memory 104 under control of the CPU 101. In alternative to the SSD, a hard disk drive (HDD) may be used. The medium I/F 107 controls reading or writing of data with respect to a recording medium 106 such as a flash memory. The operation key (keys) 108 is operated by a user to input a user instruction such as a user selection of a communication destination of the videoconference terminal 13. The power switch 109 is a switch that receives an instruction to turn on or off the power of the videoconference terminal 13.

The network I/F 111 allows communication of data with an external device through the communication network 100 such as the Internet. The camera 112 is an example of built-in imaging device capable of capturing a subject under control of the CPU 101. The imaging element I/F 113 is a circuit that controls driving of the camera 112. The microphone 114 is an example of built-in audio collecting device capable of inputting audio under control of the CPU 101. The audio I/O I/F 116 is a circuit for inputting or outputting an audio signal between the microphone 114 and the speaker 115 under control of the CPU 101. The display I/F 117 is a circuit for transmitting image data to an external display 120 under control of the CPU 101. The external device connection I/F 118 is an interface circuit that connects the videoconference terminal 13 to various external devices. The near-distance communication circuit 119 is a communication circuit that communicates in compliance with the NFC, the Bluetooth, and the like.

The bus line 110 may be an address bus or a data bus, which electrically connects various elements such as the CPU 101 of FIG. 7.

The display 120 is an example of a displaying unit, such as a liquid crystal or organic electroluminescence (EL) display that displays an image of a subject, an operation icon, or the like. The display 120 is connected to the display I/F 117 by a cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a USB cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the videoconference terminal 13. The recording medium 106 can be any non-volatile memory that reads or writes data under control of the CPU 101, such that any memory such as an EEPROM may be used instead of the flash memory 104.

<Example Screens of Electronic Whiteboard>

Figure 8B:
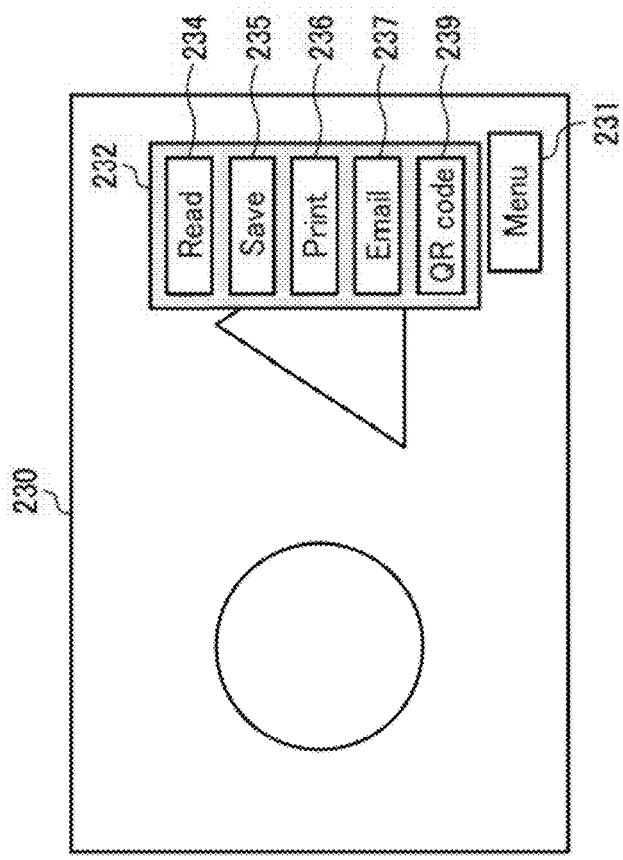
FIGS. 8A and 8B (FIG. 8) are an illustration of example screens displayed by a display at the electronic whiteboard.
Figure 8A:
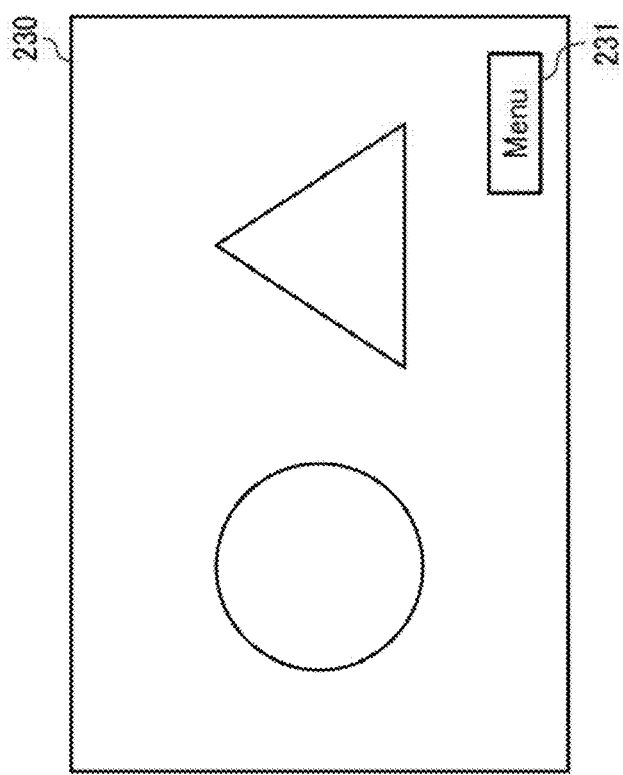

Referring to FIGS. 8 to 10, example screens of the electronic whiteboard 2 are described according to the embodiment. FIGS. 8 to 10 each illustrate a screen displayed by the electronic whiteboard 2. The electronic whiteboard 2 displays, on the display 220, a drawing image screen 230 as illustrated in FIG. 8A, for example. The drawing image screen 230 displays a drawing image (such as a circle and a triangle in figure) drawn by the user with such as the electronic pen 2500. The drawing image screen 230 displays a "Menu" button 231 at the lower right. The "Menu" button 231 is a graphical image, when selected by the user, performs various types of functions of the electronic whiteboard 2. When the user presses the "Menu" button 231 with such as the electronic pen 2500, as illustrated in FIG. 8B, the electronic whiteboard 2 displays, on the drawing image screen 230, a menu selection window (image) 232 for allowing selection of a function provided by the electronic whiteboard 2.

As illustrated in FIG. 8B, the menu selection window 232 includes a "Read" button 234, a "Save" button 235, a "Print" button 236, an "Email" button 237, and a "QR code" button 239.

Of those buttons, the "Read" button 234 is a graphical image, which, when selected, causes the electronic whiteboard 2 to read drawing image data that is stored in the SSD 204 after the image is drawn, for display onto the display 220. The "Save" button 235 is a graphical image, which, when selected, causes the electronic whiteboard 2 to store the drawing image drawn by the user in the SSD 204 as the drawing image data. The "Print" button 236 is a graphical image, which, when selected, causes the electronic whiteboard 2 to print the drawing image displayed on the drawing image screen 230 using such as the MFP 9. The "Email" button 237 is a graphical image, which, when selected, causes the electronic whiteboard 2 to transmit the drawing image displayed on the drawing image screen 230, as the drawing image data attached to the email. The "QR code" button 239 is a graphical image, which, when selected, causes the electronic whiteboard 2 to display, on the display 220, a QR code embedded with a device ID identifying the own device (that is, the electronic whiteboard 2).

Next, example screens to be displayed by the electronic whiteboard 2 when the buttons 234 to 237 and 239 are respectively selected, are described.

In response to pressing of the "Read" button 234 by the user, the electronic whiteboard 2 controls the display 220 to display a folder selection screen 240 as illustrated in FIG.

Figure 9A:
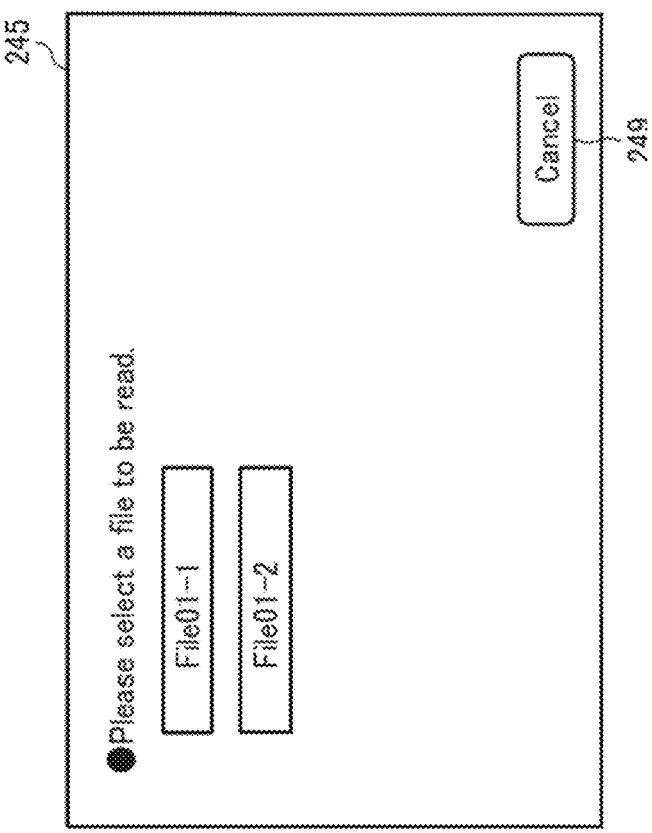
FIGS. 9A, 9B, 9C, and 9D (FIG. 9) are an illustration of example screens displayed by the display at the electronic whiteboard.
Figure 9B:
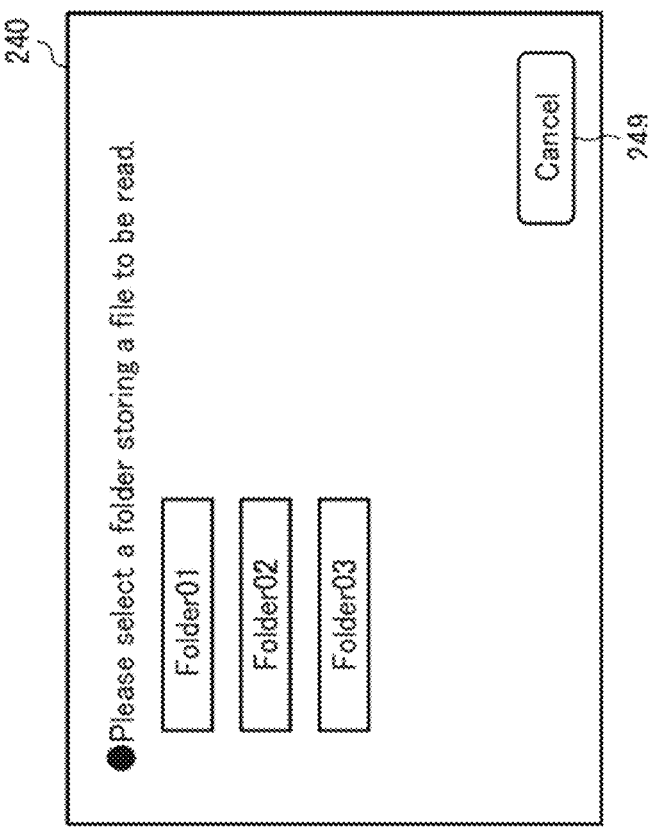

9A. The folder selection screen 240 displays a plurality of folder icons to be used for selecting a folder storing an electronic file to be read. When the user selects a desired folder icon ("folder 01", for example) with the electronic pen 2500, the electronic whiteboard 2 displays, on the display 220, a file selection screen 245 as illustrated in FIG. 9B. The file selection screen 245 displays a plurality of file icons to be used for selecting an electronic file to be read. When the user selects a desired file icon with the electronic pen 2500, the electronic whiteboard 2 displays, on the display 220, a drawing image screen 230 including a drawing image of the selected file, as illustrated in FIG. 8A.

Figure 9C:
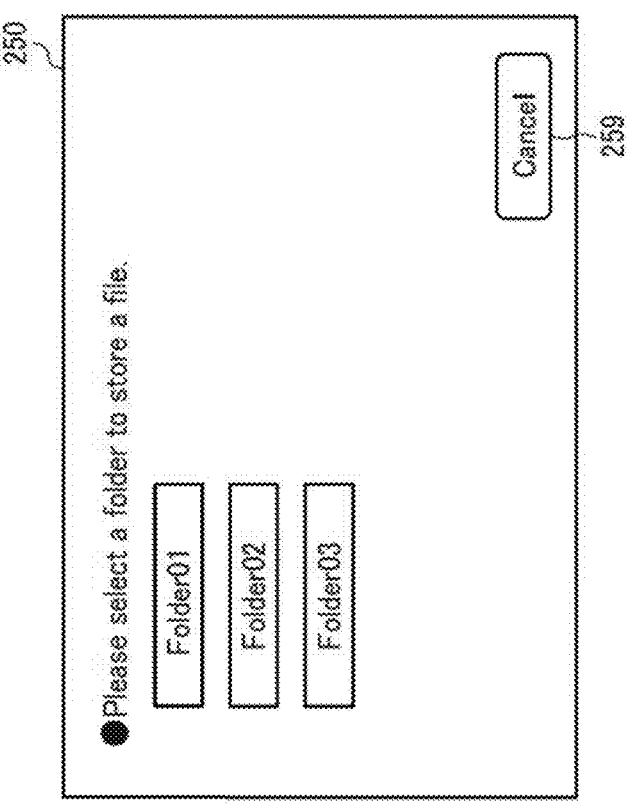

In response to pressing of the "Save" button 235 by the user, the electronic whiteboard 2 controls the display 220 to display a folder selection screen 250 as illustrated in FIG. 9C. The folder selection screen 250 displays a plurality of folder icons to be used for selecting a folder to store an electronic file. The user selects the folder to store the electronic file, by selecting a desired folder icon with the electronic pen 2500.

Figure 9D:
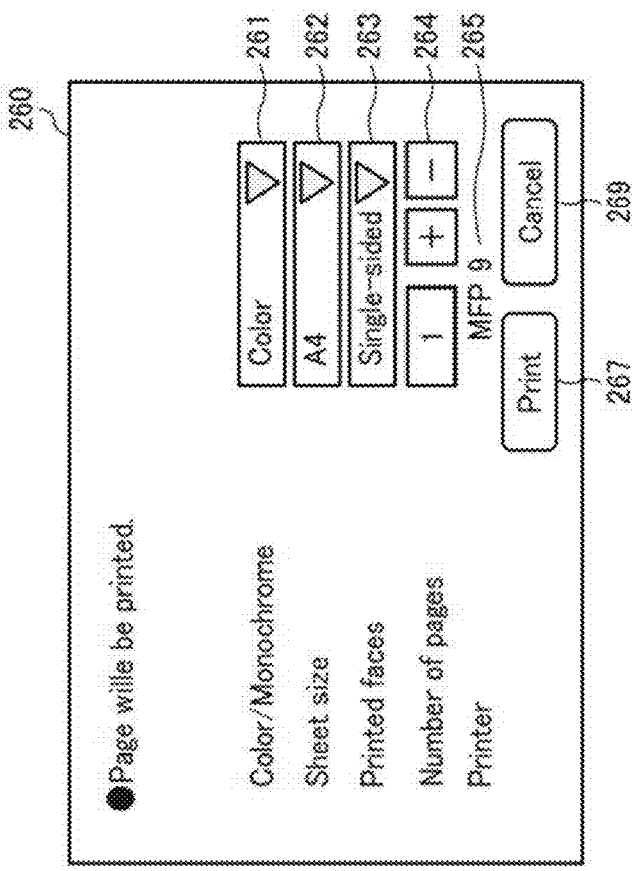

In response to pressing of the "Print" button 236 by the user, the electronic whiteboard 2 controls the display 220 to display a print configuration screen 260 as illustrated in FIG. 9D. The print configuration screen 260 displays various types of print parameters, and a pull-down menu to be used for changing a configuration for each of the print parameters. The print configuration screen 260 includes the menus 261 to 264, respectively, for selecting color or monochrome printing, selecting a sheet size (A4, A3, etc.), selecting faces to be printed (single-sided or duplex), and selecting the increase or decrease of a number of pages to be printed. The print configuration screen 260 further displays, in a field 265, a device name identifying a printer to print (in this example, "MFP 9"). The print configuration screen 260 displays a "Print" button 267 to be pressed by the user to start printing. For each of the screens illustrated in FIGS. 9A, 9B, 9C, and 9D, "Cancel" buttons 249, 259, and 269 are displayed to return to the drawing image screen 230 illustrated in FIG. 8A.

Figure 10A:
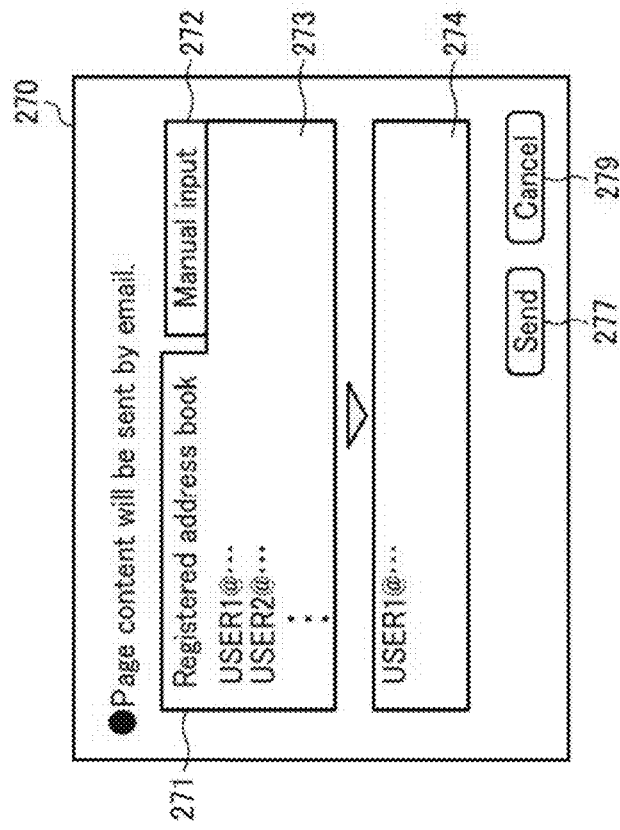
FIGS. 10A, 10B, 10C, and 10D (FIG. 10) are an illustration of example screens displayed by the display at the electronic whiteboard.
Figure 10B:
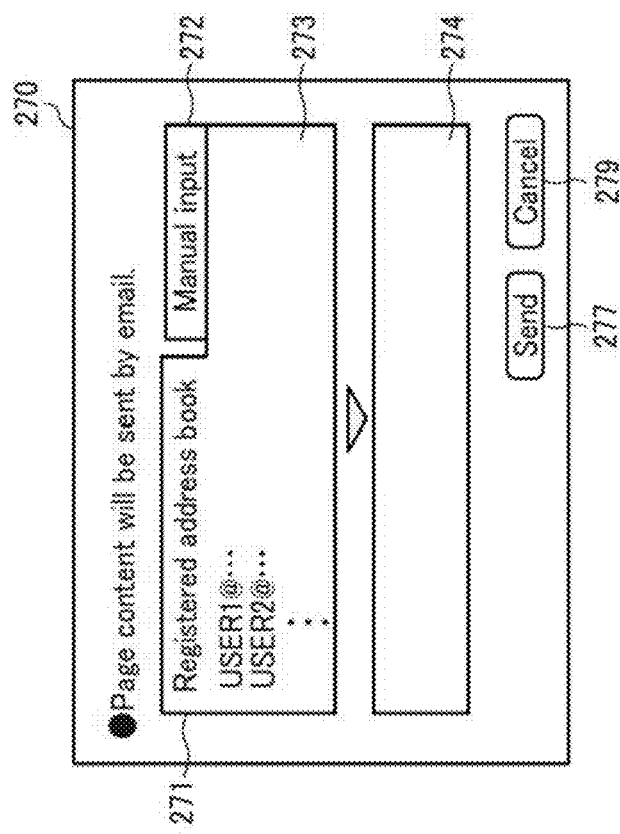

In response to pressing of the "Email" button 237 by the user, the electronic whiteboard 2 controls the display 220 to display a destination configuration screen 270 illustrated in FIG. 10A. The destination configuration screen 270 includes a "Registered address book" tab 271 for showing registered email addresses, and a "Manual input" tab 272 for allowing the user to manually input an email address with such as the electronic pen 2500. In this example, a case where the "Registered address book" tab 271 is selected is displayed. The destination configuration screen 270 displays a registered address book field 273 that lists the registered email addresses. When the user selects a desired email address (in this example, "USER1@ . . . ") with the electronic pen 2500, the electronic whiteboard 2 displays the email address selected by the user in an address configuration field 274 as illustrated in FIG. 10B. The destination configuration screen 270 displays a "Send" button 277 to be selected by the user to start transmission of email. In another example, the electronic whiteboard 2 may display an email configuration screen 280 as illustrated in FIG. 10C, as a screen to be displayed to an administrator or a service engineer, but not to the general user. The email configuration screen 280 includes a server address field 281, a port number field 282, a sender email address field 283, an authentication requirement field 284, an account field 285, and a password field 286.

The server address field 281 is a field to be entered with an IP address of the mail server 7. The port number field 282 is a field to be entered with a port number of a port that the mail server 7 opens to accept emails. The sender email field 283 is previously set with an email address assigned to the electronic whiteboard 2, as the electronic whiteboard 2 is an email sender. That is, the email sender is not a user operating the electronic whiteboard 2, but is previously set as the electronic whiteboard 2. The authentication requirement field 286 is a field to be set with information indicating whether or not to request the mail server 7 to authenticate the email sender. The account field 285 and the password field 286 are entered with account information, which is to be used by the mail server 7 to authenticate the electronic whiteboard two using Send Mail Transfer Protocol (SMTP).

Figure 10D:
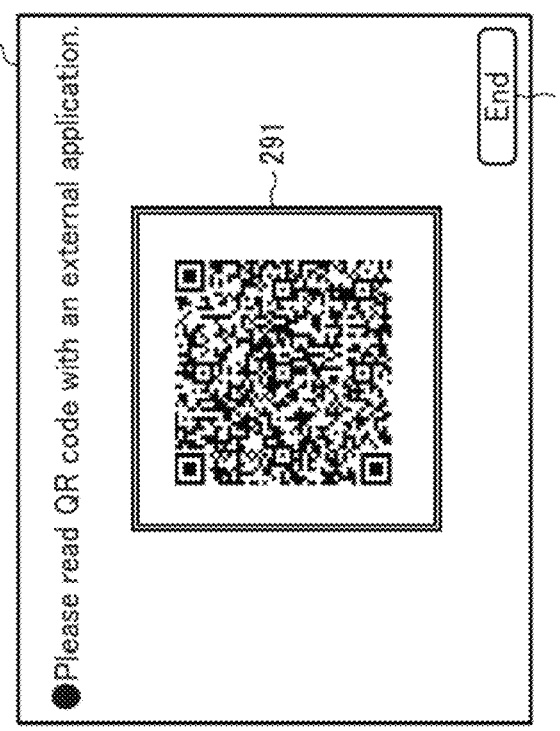
Figure 10C:
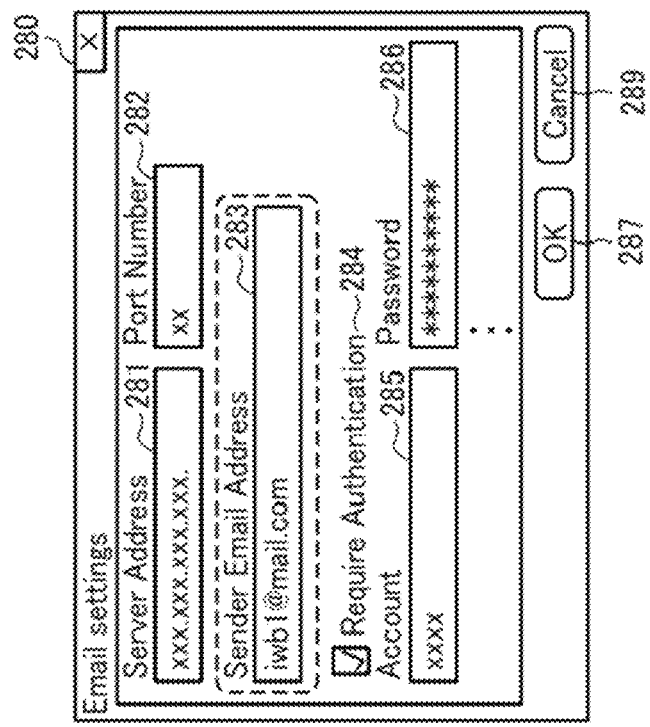

In response to pressing of the "QR code" button 239 by the user, the electronic whiteboard 2 controls the display 220 to display a QR code display screen 290 as illustrated in FIG. 10D. The QR code display screen 290 displays a QR code 291 embedded with the device ID for identifying the electronic whiteboard 2 (the own device). For example, the user activates a QR code reader application installed on such as the smart phone, to cause the activated reader application to read the QR code 291 to obtain the device ID. The QR code display screen 290 further includes an "End" button 297, which switches back from the QR code display screen 290 to the drawing image screen 230. For each of the screens illustrated in FIGS. 10A, 10B, and 10C, "Cancel" buttons 279 and 289 are displayed to return to the drawing image screen 230 illustrated in FIG. 8A.

Any one of the IDs described above is an example of identification information identifying the device or terminal, or the user operating the device or terminal. In alternative to the device ID or terminal ID for identifying a specific device, a manufacturing number may be used as identification information for identifying the device or terminal. In alternative to the user name identifying a specific user, any user name capable of identifying the user such as a user's nickname may be registered.

Further, any one of the above-described control programs may be recorded in a file in a format installable or executable on a computer-readable recording medium for distribution. Examples of the recording medium include, but not limited to, a compact disc-recordable (CD-R), digital versatile disc (DVD), blue-ray disc, and SD card. In addition, such recording medium may be provided in the form of a program product to users within a certain country or outside that country.

The server 5 may be configured by a single computer or a plurality of computers to which divided portions (functions or storages) are arbitrarily allocated.

<Functional Configuration of Communication System>

Figure 11:
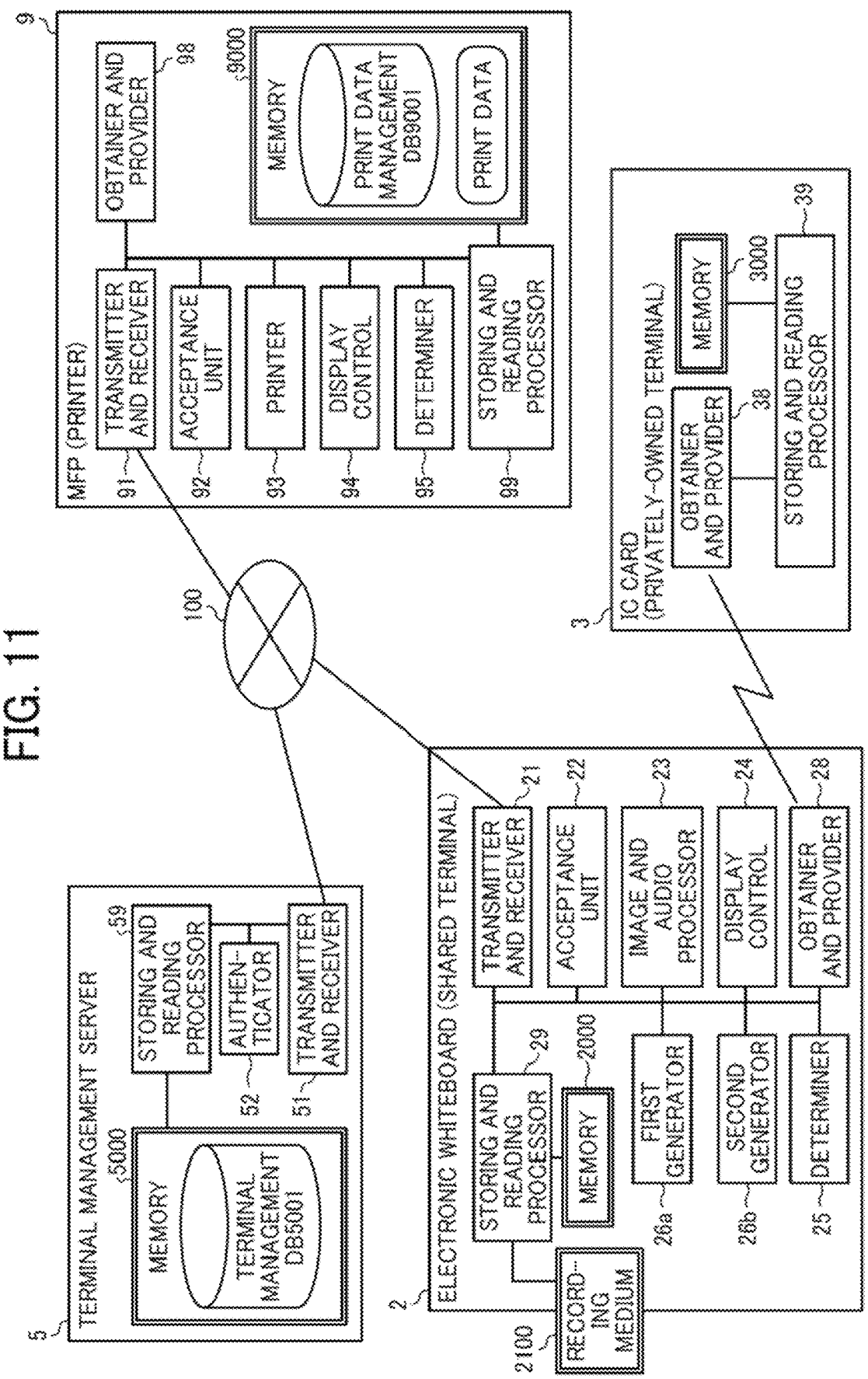
FIG. 11 is a schematic diagram illustrating a functional configuration of the communication system, according to an embodiment.

Referring to FIGS. 11 and 12, a functional configuration of the communication system 1 is described according to the embodiment. FIG. 11 is a diagram illustrating a functional configuration of the communication system 1. In FIG. 11, only a part of those terminals, devices, and servers illustrated in FIG. 1 is illustrated, which relates to processing or operation of printing drawing image data, as described below. In other words, the electronic whiteboard 2$y$ and videoconference terminal 13 do not have to be provided. Since the IC card 3 and the smart phone 4 both have the same function of providing the terminal ID identifying the own device, to the electronic whiteboard 2, the example case of using the IC card 3 is described in the following embodiment referring to FIG. 11.

<Functional Configuration of Electronic Whiteboard>

As illustrated in FIG. 11, the electronic whiteboard 2 includes a transmitter and receiver 21, an acceptance unit 22, an image and audio processor 23, a display control 24, a determiner 25, a first generator 26a, a second generator 26b, an obtainer and provider 28, and a storing and reading processor 29. These units are functions that are implemented by or that are caused to function by operating any of the elements illustrated in FIG. 2 in cooperation with the instructions of the CPU 201 according to the electronic whiteboard control program expanded from the SSD 204 to the RAM 203. The electronic whiteboard 2 further includes a memory 2000, which is implemented by the RAM 203 and SSD 204 illustrated in FIG. 2.

(Each Functional Unit of Electronic Whiteboard)

Next, each functional unit of the electronic whiteboard 2 is described according to the embodiment. The transmitter and receiver 21, which may be implemented by the instructions of the CPU 201, the network I/F 205, and the external device connection I/F 206, illustrated in FIG. 2, transmits or receives various data (or information) to or from other terminal, apparatus, or system through the communication network 100.

The acceptance unit 22, which is implemented by the instructions of the CPU 201, the contact sensor 215, and the electronic pen controller 216, illustrated in FIG. 2, accepts various inputs from the user.

The image and audio processor 23 is implemented by the instructions of the CPU 201, illustrated in FIG. 2. The image and audio processor 23 applies image processing to an image of a subject that has been captured by the camera 2400. After the audio of the user is converted to an audio signal by the microphone 2200, the image and audio processor 23 applies processing to audio data based on this audio signal. The image and audio processor 23 outputs the audio signal according to the audio data to the speaker 2300, and the speaker 2300 outputs audio. The image and audio processor 23 obtains drawing image data, drawn by the user with the electronic pen 2500 or the user's hand H onto the display 220, and converts the drawing image data to coordinate data. For example, when the electronic whiteboard 2x transmits the coordinate data to the whiteboard 2y at another site, the electronic whiteboard 2y controls the display 220 to display a drawing image having the same content based on the received coordinate data.

The display control 24, which is implemented by the instructions of the CPU 201 illustrated in FIG. 2 and by the display controller 213 illustrated in FIG. 2, controls the display 220 to display a drawing image.

The determiner 25, which is implemented by the instructions of the CPU 201 illustrated in FIG. 2, determines whether the electronic whiteboard 2 has received any terminal ID, for example, from the IC card 3 or the smart phone 4.

The first generator 26a, which is implemented by the instructions of the CPU 201 illustrated in FIG. 2, generates image data in such as PRCS, from the drawing image data in bitmap that has been generated based on drawing by the user. The second generator 26b, which is implemented by the instructions of the CPU 201 illustrated in FIG. 2, generates image data in PDF, from the drawing image data in bitmap that has been generated based on drawing by the user.

The obtainer and provider 28, which is implemented by the instructions of the CPU 201 and the near-distance communication circuit 219 with the antenna 219a, illustrated in FIG. 2, communicates with the IC card 3 and the smart phone 4 to obtain or provide data from or to the IC card 3 or the smart phone 4 by near-distance communication.

The storing and reading processor 29, which is implemented by the instructions of the CPU 201 and the SSD 204 illustrated in FIG. 2, performs processing to store various types of data in the memory 2000 or the recording medium 2100 or to read various types of data stored in the memory 2000 or the recording medium 2100. Further, every time image data and audio data are received in performing communication with other electronic whiteboard or videoconference terminal, the memory 2000 overwrites the image data and audio data. The display 220 displays an image based on image data before being overwritten, and the speaker 2300 outputs audio based on audio data before being overwritten. The recording medium 2100 is implemented by the USB memory 2600 illustrated in FIG. 2.

<Functional Configuration of IC Card>

As illustrated in FIG. 11, the IC card 3 includes an obtainer and provider 38, and a storing and reading processor 39. These units are functions that are implemented by or that are caused to function by operating any of the elements illustrated in FIG. 3 in cooperation with the instructions of the CPU 311 according to the IC card control program expanded from the EEPROM 314 to the RAM 313. The IC card 3 further includes a memory 3000, which is implemented by the RAM 313 and the EEPROM 314 illustrated in FIG. 3.

(Each Functional Unit of IC Card)

Next, each functional unit of the IC card 3 is described according to the embodiment. The obtainer/provider 38, which is implemented by the instructions of the CPU 311 and the antenna coil 330 illustrated in FIG. 3, communicates with the electronic whiteboard 2 to obtain or provide data from or to the electronic whiteboard 2 by near-distance communication.

The storing and reading processor 39, which is implemented by the instructions of the CPU 311 illustrated in FIG. 3, performs processing to store various types of data in the memory 3000 or read various types of data stored in the memory 3000. The memory 3000 stores a terminal ID for identifying the IC card 3 as one example of privately-owned terminal. In case the privately-owned terminal is the smart phone 4, the memory 3000 stores a terminal ID for identifying the smart phone 4.

<Functional Configuration of Terminal Management Server>

The terminal management server 5 includes a transmitter and receiver 51, an authenticator 52, and a storing and reading processor 59. These units are functions that are implemented by or that are caused to function by operating any of the elements illustrated in FIG. 5 in cooperation with the instructions of the CPU 501 according to the terminal control program expanded from the HD 504 to the RAM 503. The terminal management server 5 includes a memory 5000 implemented by the HD 504 illustrated in FIG. 5.

(Terminal Management Table)

FIG. 12A is a conceptual diagram illustrating a terminal management table according to the embodiment. The memory 5000 stores a terminal management DB 5001, which is implemented by the terminal management table illustrated in FIG. 12A. The terminal management table illustrated in FIG. 12A stores, for each one of a plurality of privately-owned terminals (IC card 3, smart phone 4) registered to the terminal management server 5, a user name identifying a user who owns the privately-owned terminal in association with the terminal ID identifying the privately-owned terminal.

(Each Functional Unit of Destination Management Server)

Next, each functional unit of the terminal management server 5 is described in detail according to the embodiment. In the following description of the functional configuration of the terminal management server 5, relationships of one or more hardware elements in FIG. 5 with each functional unit of the terminal management server 5 in FIG. 11 will also be described.

The transmitter and receiver 51 of the terminal management server 5 illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The authenticator 52, which is implemented by the instructions of the CPU 501 illustrated in FIG. 5, determines whether a terminal ID transmitted from the electronic whiteboard 2 is a privately-owned terminal (IC card 3, smart phone 4) owned by the authorized user, which is previously registered.

The storing and reading processor 59, which is implemented by the instructions of the CPU 501 illustrated in FIG. 5 and the HDD 505 illustrated in FIG. 5, performs processing to store various types of data in the memory 5000 or read various types of data stored in the memory 5000.

<Functional Configuration of MFP>

As illustrated in FIG. 11, the MFP 9 includes a transmitter and receiver 91, an acceptance unit 92, a printer 93, a display control 94, a determiner 95, an obtainer and provider 98, and a storing and reading processor 99. These units are functions that are implemented by or that are caused to function by operating any of the hardware elements illustrated in FIG. 6 in cooperation with the instructions of the CPU 901 according to the printer control program expanded onto the RAM 902b. The MFP 9 further includes a memory 9000 implemented by the HD 909 illustrated in FIG. 6.

(Print Data Management Table)

FIG. 12B is a conceptual diagram illustrating a print data management table, according to the embodiment. The memory 9000 stores a print data management DB 9001 implemented by the print data management table illustrated in FIG. 12B. The print data management table illustrated in FIG. 12B stores, for each one of a plurality of print jobs, a user name identifying a user who requests for printing, a file name of data to be printed ("print data") such as image data to be printed, and a print configuration parameter to be used for printing such data, in association with one another.

In the following description of the functional configuration of the MFP 9, relationships of the elements in FIG. 6 with the functional configuration of the MFP 9 in FIG. 11 will also be described.

The transmitter/receiver 91 of the MFP 9 illustrated in FIG. 11, which is implemented by the instructions of the CPU 901 illustrated in FIG. 6 and by the network I/F 950 illustrated in FIG. 6, transmits or receives various types of data (or information) to or from another terminal, device, or system via the communication network 100.

The acceptance unit 92, which is implemented by the instructions of the CPU 901 and the control panel 940 illustrated in FIG. 6, accepts various inputs from the user.

The printer 93, which is implemented by the instructions of the CPU 901 and the printer controller 932 illustrated in FIG. 6, prints an image based on the data to be printed (print data), such as image data, using an image forming device.

The display control 94, which is implemented by the instructions of the CPU 901 and the control panel 940 illustrated in FIG. 6, displays, through the control panel 940, various print configuration parameters such as information indicating color printing or monochrome printing.

The determiner 95, which is implemented by the instructions of the CPU 901, determines whether a name of a requester in the print data is the electronic whiteboard 2.

The obtainer and provider 98, which is implemented by the instructions of the CPU 901 and the near-distance communication circuit 920 with the antenna 920a, illustrated in FIG. 6, communicates with the IC card 3 or the smart phone 4 to obtain or provide data from or to the IC card 3 or the smart phone 4 by near-distance communication.

The storing and reading processor 99, which may be implemented by the instructions of the CPU 901 and the HDD 908, illustrated in FIG. 6, performs processing to store various types of data in the memory 9000 or read various types of data stored in the memory 9000.

<Operation>

Figure 13:
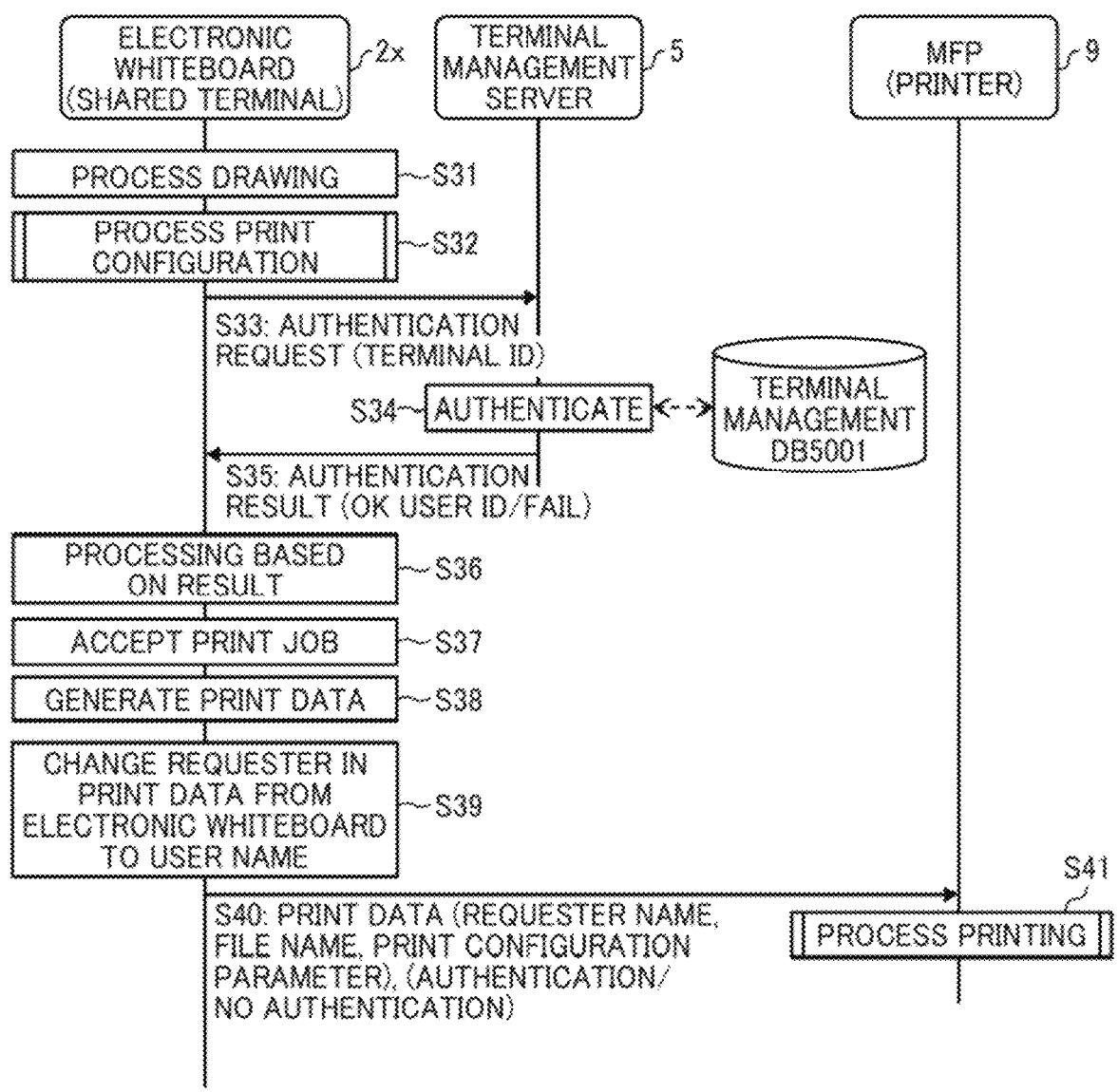
FIG. 13 is a sequence diagram illustrating operation of preparing for printing drawing image data, according to an embodiment.
Figure 14:
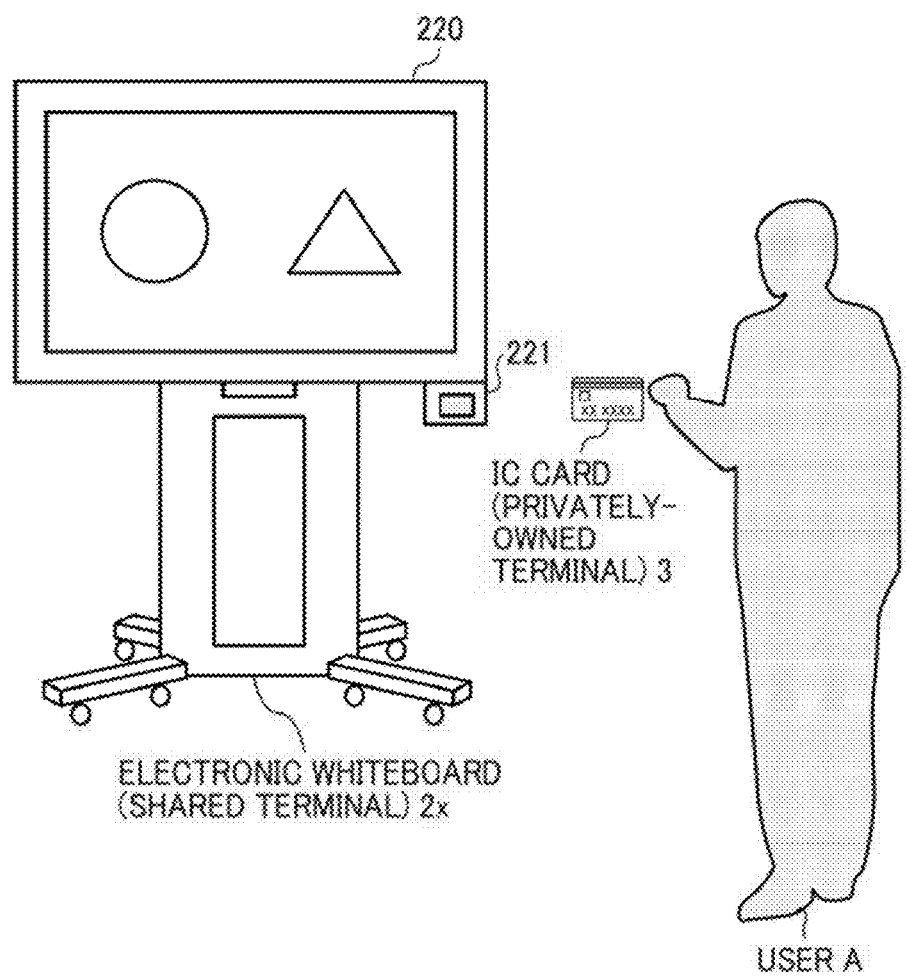
FIG. 14 is an illustration for explaining a use scenario of the electronic whiteboard, according to an embodiment.

Referring to FIGS. 13 to 19, operation performed by the communication system 1 is explained according to an embodiment of the present invention. FIG. 13 is a data sequence diagram illustrating operation for preparing printing of drawing image data, according to the embodiment. FIG. 14 is an illustration for explaining a use scenario of the electronic whiteboard 2, according to the embodiment. The following describes an example case in which the user A and the user B are having a meeting in a certain meeting room using the electronic whiteboard 2x, as illustrated in FIG. 1. After an image is drawn by at least one of the user A and the user B, the electronic whiteboard 2x transmits image data relating to the drawing image, such as the drawing image data, to the MFP 9. The near-distance communication device 221 of the electronic whiteboard 2x is implemented by the near-distance communication circuit 219 and the antenna 219a, which functions as the obtainer and provider 28.

Figure 15:
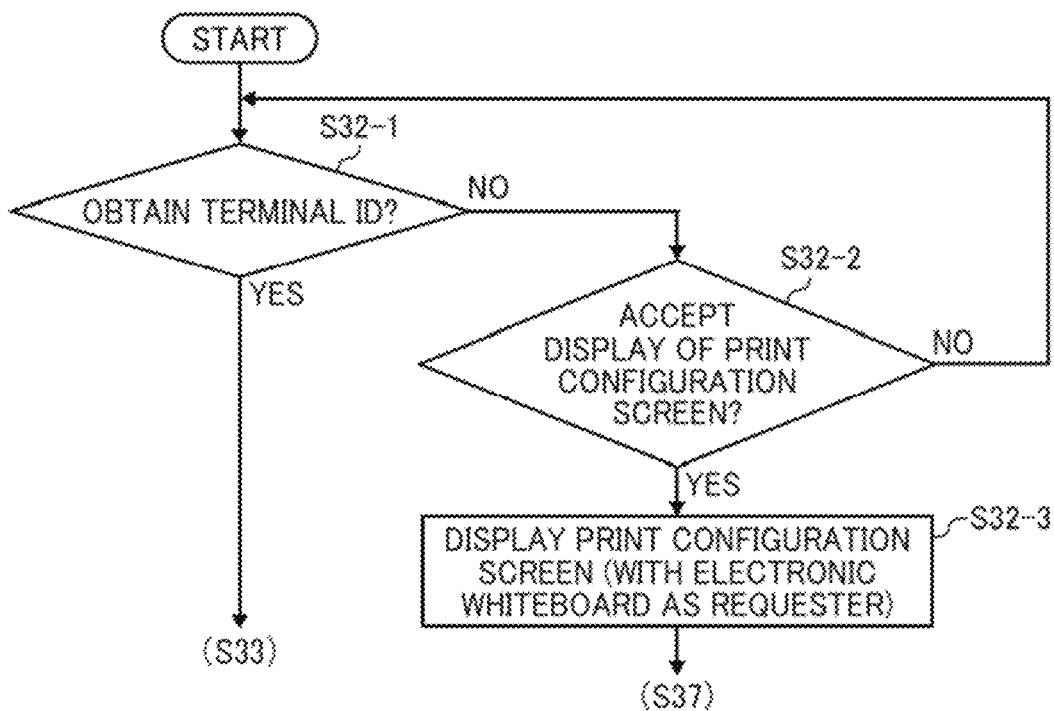
FIG. 15 is a flowchart illustrating operation of processing print configuration, according to an embodiment.

Referring to FIG. 13, the users A and B conduct the meeting, using a drawing image drawn on the electronic whiteboard 2x with the electronic pen 15. The electronic whiteboard 2x processes the drawing image drawn by the user A or B to generate drawing image data (S31). As described above, the drawing image data may be transmitted to the MFP 9. As illustrated in FIG. 14, for example, after drawing an image, the user A brings his or her IC card 3 into proximity of the near-distance communication device 221 of the electronic whiteboard 2x. The electronic whiteboard 2x starts processing to prepare for printing of drawing image data (S32). More specifically, the obtainer and provider 28 of the electronic whiteboard 2x obtains the terminal ID for identifying the IC card 3 (as the privately-owned terminal), from the obtainer and provider 38 of the IC card 3. Referring to FIG. 15, operation of processing print configuration, performed at S32, is described in detail. FIG. 15 is a flowchart illustrating operation of processing print configuration, according to the embodiment.

As illustrated in FIG. 15, the determiner 25 of the electronic whiteboard 2x determines whether the terminal ID is obtained at the obtainer and provider 28 (S32-1). In this example, it is assumed that the determiner 25 determines that the terminal ID is obtained ("YES"), and the operation proceeds to S33 illustrated in FIG. 13.

In contrary, at S32-1, when the determiner 25 determines that the terminal ID is not obtained ("NO"), the determiner 25 further determines whether an instruction to display the print configuration screen 260 is accepted (S32-2). At S32-2, when the determiner 25 determines that the instruction to display the destination configuration screen 260 is not accepted ("NO" at S32-2), the operation returns to S32-1.

Figure 16A:
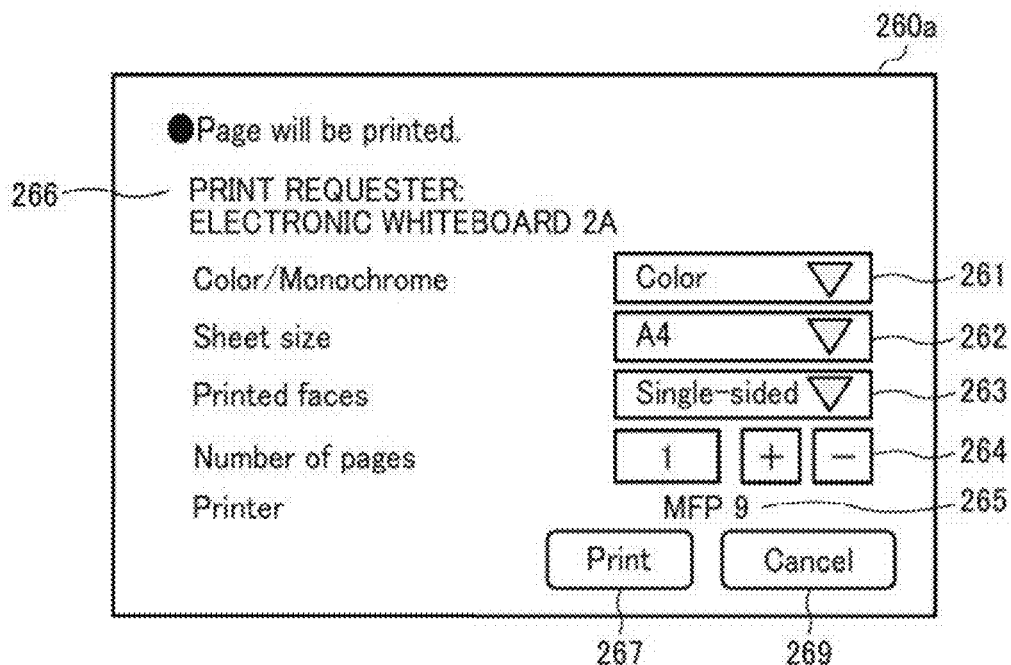
FIGS. 16A and 16B (FIG. 16) are an illustration of example screens displayed by the display at the electronic whiteboard.

In contrary, at S32-2, when the determiner 25 determines that the instruction to display the destination configuration screen 260 is accepted ("YES" at S32-2), the display control 24 causes the display 220 to display the destination configuration screen 260 as illustrated in FIG. 9D (S32-3). Assuming that the user A instructs printing, the user A presses the "Menu" button 231 illustrated in FIG. 8A, to cause the display 220 to display the menu selection screen 232 as illustrated in FIG. 8B. The user A further presses the "Print" button 236 to display the print configuration screen 260 illustrated in FIG. 9D. In such case, as illustrated in FIG. 16A, the display control 24 may display a print configuration screen 260a, with a print requester field 266 indicating that the print requester is the "electronic whiteboard". The "electronic whiteboard" to be displayed in this field is any text, which is previously set in the electronic whiteboard 2. The operation then proceeds to S37 of FIG. 13.

Assuming that the determiner 25 determines that the terminal ID is obtained ("YES" at S32-1), processing after S33 is described referring to FIG. 13.

The transmitter and receiver 21 of the electronic whiteboard 2x transmits an authentication request for authenticating the IC card 3 to the terminal management server 5 (S33). The authentication request includes the terminal ID of the IC card 3, obtained at the obtainer and provider 28. The terminal management server 5 receives the authentication request at the transmitter and receiver 51.

The authenticator 52 of the terminal management server 5 authenticates the IC card 3 using the terminal ID that is obtained (S34). More specifically, the storing and reading processor 59 searches the terminal management table (FIG. 12A) in the terminal management DB 5001 using the terminal ID received at S33 as a search key, to obtain the user name associated with the terminal ID. When the user name associated with the terminal ID is found, the authenticator 52 confirms to determine that the IC card 3 (terminal ID) is a legitimate IC card owned by the authorized user identified with the user name that is found. When the user name associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S35). When the authenticator 52 determines that the IC card 3 is a legitimate IC card, the authentication result includes information indicating that the IC card 3 is a legitimate IC card and the user name identifying the user who owns the IC card 3. When the authenticator 52 determines that the IC card 3 is not a legitimate IC card, the authentication result includes information indicating that the IC card 3 is not a legitimate IC card. The transmitter and receiver 21 of the electronic whiteboard 2x receives the authentication result.

Figure 16B:
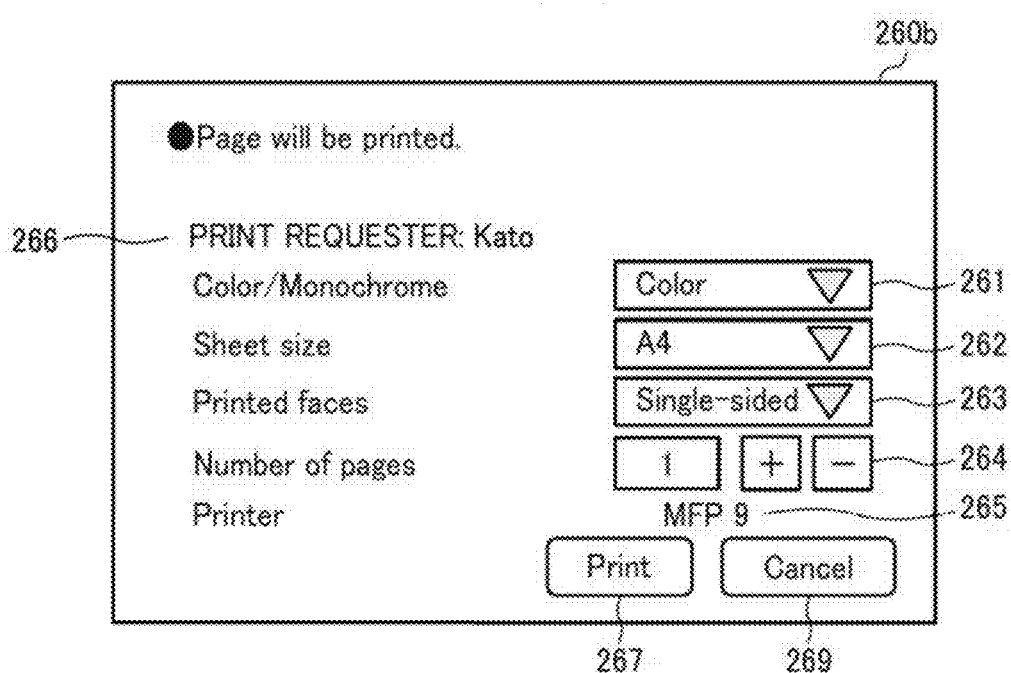

Next, the electronic whiteboard 2x performs processing based on the authentication result (S36). In one example, when the authentication result includes information indicating that the IC card 3 is not a legitimate IC card, the display control 24 controls the display 220 to display a message indicating that printing is not allowed. When the authentication result includes information indicating that the IC card 3 is a legitimate IC card, the display control 24 of the electronic whiteboard 2x displays the print configuration screen 260 illustrated in FIG. 9D. As described above, as illustrated in FIG. 14, the user only needs to bring the IC card 3 into proximity to the near-distance communication device 221 to display the print configuration screen 260, such that pressing of the "Menu" button 231 or the "Print" button 236 is not needed. In this example, in alternative to displaying the print configuration screen 260, the display control 24 may display a print configuration screen 260b with the print requester field 266 indicating that the print requester is "Kato", as illustrated in FIG. 16B. More specifically, the display control 24 displays the user name, which is received at S35, which indicates the user who owns the IC card 3.

Next, using the print configuration screen of FIG. 9D, FIG. 16A, or FIG. 16B, the acceptance unit 22 of the electronic whiteboard 2x accepts set values of one or more print configuration parameters, with pressing of "Print" button 267 (S37). The first generator 26a generates image data in PRCS, from the drawing image data in bitmap that has been generated based on drawing by the user A or B, as print data (S38). When the determiner 25 determines that the terminal ID is obtained at S32-1 of FIG. 15 ("YES" at S32-1), S33 to S35 are performed to obtain the user name of the user who requests a print job using the IC card 3. The first generator 26a changes the print requester name in the print data, from the electronic whiteboard ("electronic whiteboard 2A" in this example) to the user name that is obtained ("user A" in this example) (S39). When the operation of FIG. 15 proceeds to S32-3, the first generator 26a leaves the print requester name in the print data as it is, to indicate that the electronic whiteboard is the print requester. For example, the print requester name may be associated with the print data as attribute data or included as header data.

Referring back to FIG. 13, the transmitter and receiver 21 transmits the print data generated at S38, which may be modified at S39, to the MFP 9 (S40). In addition to the print requester name, the print data includes other information regarding the print data such as a file name and print configuration parameters with the set values, for example, as attribute data. The transmitter and receiver 91 of the MFP 9 receives the print data.

Further, when the determiner 25 determines that the terminal ID is not obtained at S32-1 of FIG. 15, at S40, the transmitter and receiver 21 of the electronic whiteboard 2x further transmits information indicating that authentication is not to be performed before printing, to the MFP 9, with the print data. When the determiner 25 determines that the terminal ID is obtained at S32-1 of FIG. 15, at S40, the transmitter and receiver 21 of the electronic whiteboard 2x further transmits information indicating that authentication is to be performed before printing, to the MFP 9, with the print data.

Figure 17:
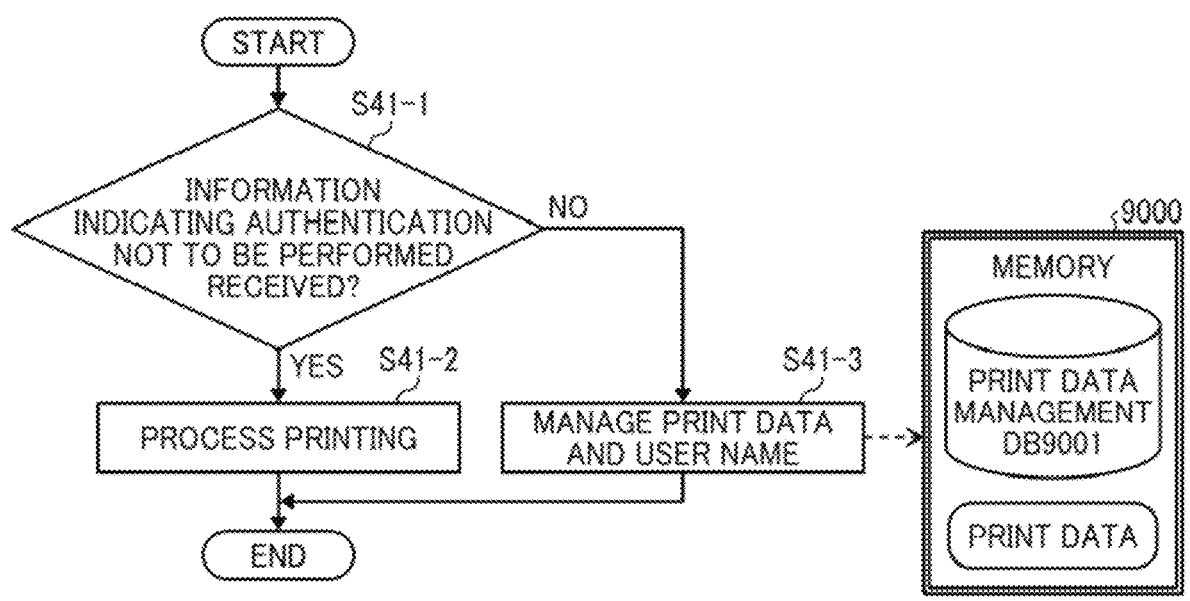
FIG. 17 is a flowchart illustrating operation of processing printing, according to an embodiment.

Next, the MFP 9 processes printing (S41). Referring to FIG. 17, operation of processing printing, performed at S41, is described in detail. FIG. 17 is a flowchart illustrating operation of processing printing, according to the embodiment.

As illustrated in FIG. 17, the determiner 95 determines whether information indicating authentication is not to be performed is received (S41-1). When the determiner 95 determines that information indicating authentication is not to be performed is received ("YES" at S41-1), the printer 93 prints out an image based on the print data (S41-2).

When the determiner 95 determines that information indicating authentication is not to be performed is not received, that is, information indicating authentication is to be performed is received ("NO" at S41-1), the printer 93 does not print out an image based on the print data. Instead, the storing and reading processor 99 stores the print data received at S40 in the memory 9000, and further stores information regarding the print data in the print data management table of FIG. 12B (S41-3). As described above, the information regarding the print data includes the print requester name, the file name of the print data, and the set values of the print configuration parameters.

As described above, as the user A brings the IC card 3 into proximity to the near-distance communication device 221, the electronic whiteboard 2x obtains a user name of the user, which is associated with the terminal ID stored in the IC card 3. When a print request is received from the user identified with the IC card 3, the electronic whiteboard 2x transmits print data to the MFP 9 to cause the print data be stored in the MFP 9. Alternatively, the user A may press the "Menu" button 231 of FIG. 8B, and further press the "Print" button 236 in the menu selection screen 232, to request for printing. In such case, the electronic whiteboard 2x transmits print data to the MFP 9 to cause the print data be printed by the MFP 9.

Figure 18:
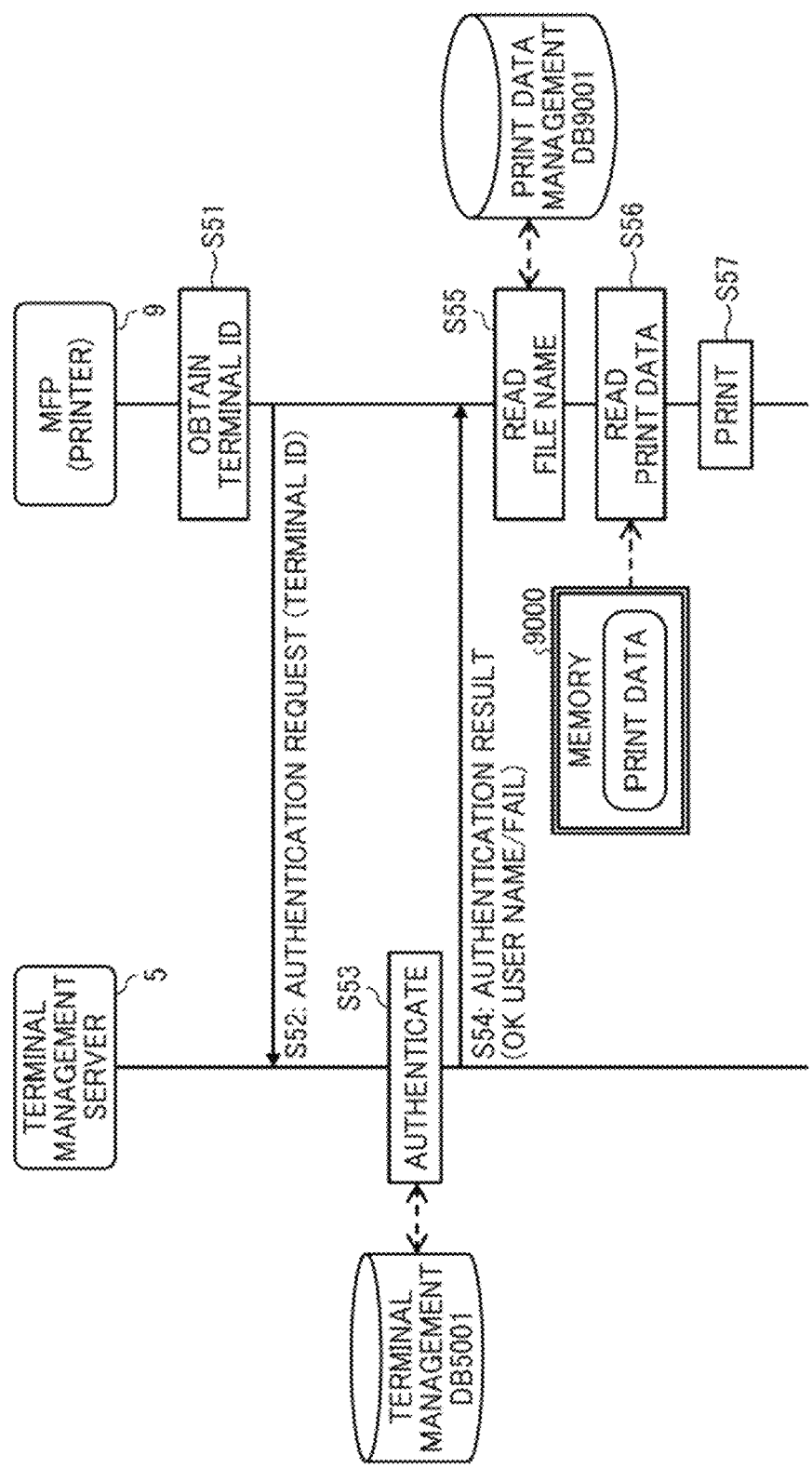
FIG. 18 is a sequence diagram illustrating operation of processing printing an image based on image data, according to an embodiment.
Figure 19:
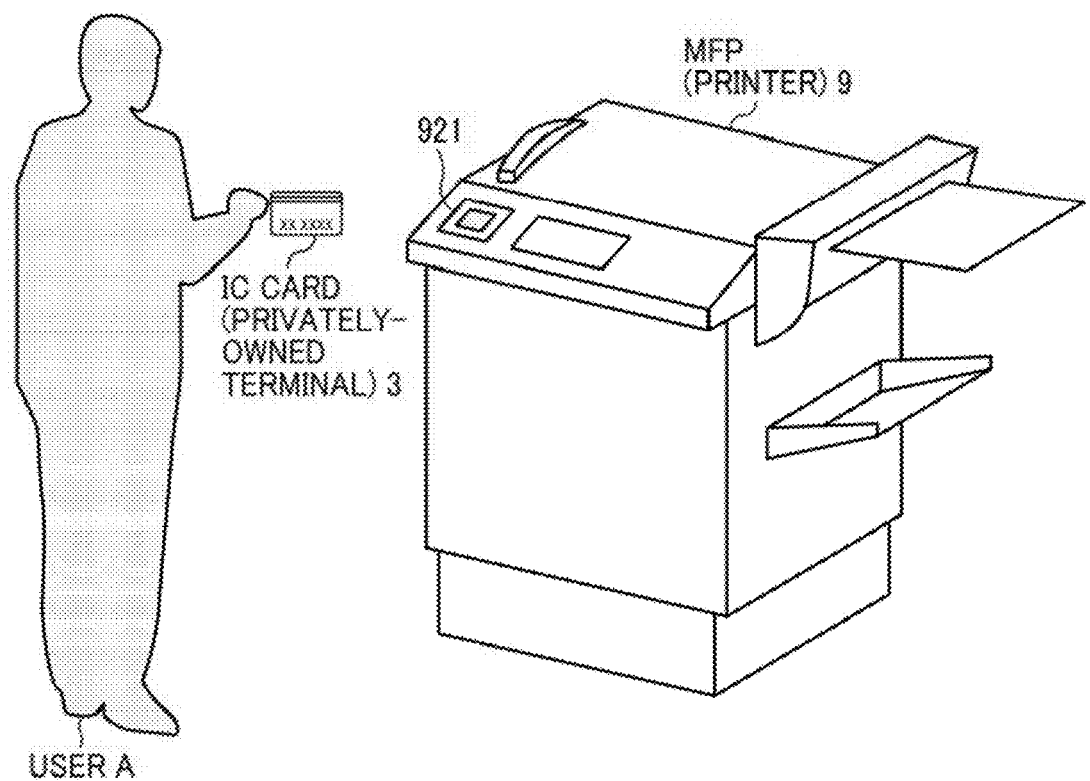
FIG. 19 is an illustration for explaining a use scenario of the MFP, according to an embodiment.

Referring to FIG. 18, operation of processing printing, performed after S41-3, is described according to the embodiment. FIG. 18 is a data sequence diagram illustrating operation of printing data such as image data (print data), according to the embodiment. FIG. 19 is an illustration for explaining a use scenario of the MFP 9, according to the embodiment. The near-distance communication device 921 of the MFP 9 is implemented by the near-distance communication circuit 920 and the antenna 920a, which functions as the obtainer and provider 98.

As the user A brings the IC card 3 into proximity to the near-distance communication device 921 of the MFP 9, the obtainer and provider 98 of the MFP 9 obtains the terminal ID for identifying the IC card 3 (as the privately-owned terminal), from the obtainer and provider 38 of the IC card 3 (S51). The transmitter and receiver 91 of the MFP 9 transmits an authentication request for authenticating the IC card 3 to the terminal management server 5 (S52). The authentication request includes the terminal ID of the IC card 3, obtained at the obtainer and provider 98. The terminal management server 5 receives the authentication request at the transmitter and receiver 51.

The authenticator 52 of the terminal management server 5 authenticates the IC card 3 using the terminal ID that is obtained (S53). More specifically, the storing and reading processor 59 searches the terminal management table (FIG. 12A) in the terminal management DB 5001 using the terminal ID received at S52 as a search key, to obtain the user name associated with the terminal ID. When the user name associated with the terminal ID is found, the authenticator 52 confirms to determine that the IC card 3 (terminal ID) is a legitimate IC card owned by the authorized user identified with the user name that is found. When the user name associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the MFP 9 (S54). When the authenticator 52 determines that the IC card 3 is a legitimate IC card, the authentication result includes information indicating that the IC card 3 is a legitimate IC card and the user name identifying the user who owns the IC card 3. When the authenticator 52 determines that the IC card 3 is not a legitimate IC card, the authentication result includes information indicating that the IC card 3 is not a legitimate IC card. The transmitter and receiver 91 of the MFP 9 receives the authentication result.

When the authentication result received at S54 includes information indicating that the IC card 3 is a legitimate IC card, the storing and reading processor 99 of the MFP 9 searches the print data management table (FIG. 12B) using the user name received at S54 as a search key, to obtain the file name associated with the received user name (S55). The storing and reading processor 99 further reads print data identified with the file name, which is read at S55, from the memory 9000 (S56). The printer 93 forms an image on a recording sheet based on the print data, and outputs the printed image (S57).

As described above, as long as the user such as the user A brings his or her IC card 3 into proximity of the near-distance communication device 921, the electronic whiteboard 2x automatically displays the print configuration screen 260b as illustrated in FIG. 9D. This simplifies user operation, compared to the case in which the user A presses the "Menu" button 231 illustrated in FIG. 8A to display the menu selection screen 232 as illustrated in FIG. 8B, and further presses the "Print" button 236 to display the print configuration screen 260 illustrated in FIG. 9D. The electronic whiteboard 2, which is an example of shared terminal, is not frequently used by one user who regularly uses his or her privately-owned terminal. This means that the user hardly remembers how to print the drawing image data with the electronic whiteboard 2. However, in the above-described embodiment, the user only needs to bring his or her IC card 3 close to the near-distance communication device 221 to display the print configuration screen 260b. This eliminates a need for requiring the user to search for a procedure of printing with the electronic whiteboard 2. Accordingly, the users using the meeting room are able to leave the meeting right after the meeting ends, without causing other user who reserves that meeting room to wait.

Moreover, in response to a request for printing using the privately-owned terminal, the electronic whiteboard 2x prints out only when the terminal management server 5 authenticates the terminal ID (S34, S35) obtained from the IC card 3, thus improving the security level.

In any one of the above-described embodiments, the electronic whiteboard 2x displays the print confirmation screen illustrated in FIG. 9D or 16B in response to detection of the IC card 3 or the smart phone 4 into proximity of the near-distance communication device 221. Alternatively, this process of displaying the print confirmation screen (S36, S37) may be omitted. In such case, in response to detection of the IC card 3 or the smart phone 4 owned by the user A to the near-distance communication device 221, the electronic whiteboard 2x automatically transmits, to the MFP 9, the print data with print configuration parameters that are set with default values. This further reduces time required for preparing printing of the print data by the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, the user may instruct the electronic whiteboard 2 to print, using the MFP 9, any desired data regarding an image being displayed on the display 220 of the electronic whiteboard 2. Examples of such data regarding the image include, but not limited to, drawing image data that reflects drawings made by the user as described above, and non-drawing image data such as data of a presentation material as described above. For example, the data of the presentation material having additional drawing made by the user, may be printed.

In another example, the electronic whiteboard 2 may generate print data based on image data of an electronic watermark, in addition to stroke data corresponding to the stroke data that reflects drawings made by the user. The electronic watermark data is any image, which is superimposed on a layer of the stroke data (that is, the drawing image data) for display to the user. The electronic watermark data may be stored in any desired memory, such as a memory of the electronic whiteboard 2. To make the stroke data visible to the user, the watermark data is displayed, for example, in partly transparent. For example, the image with the word "confidential" may be superimposed on the drawing image data, to warn the user that the drawing image data is confidential. When sending the drawing image data for printing, which is displayed with the watermark data, the electronic whiteboard 2 may generate print data of the drawing image data and the watermark data, and send the print data to the MFP 9. With the watermark being printed with the drawing image data (or any other image data), the user is able to know that such image data is confidential information.

For example, when sending the print data for printing in response to detection of the "Print" button 236 (that is, without authenticating the user with the IC card 3), the electronic whiteboard 2 may send the print data with the watermark data. When sending the print data for printing in response to detection of the IC card 3 (that is, with authenticating the user with the IC card 3), the electronic whiteboard 2 may send the print data without the watermark data.

In another example, the electronic whiteboard 2 may display the image data, such as the drawing image data, without the electronic watermark data. When sending the drawing image data for printing, the electronic whiteboard 2 may generate print data of the drawing image data and the watermark data, and send the print data to the MFP 9. This improves visibility to the user during videoconferencing or any conferencing, while increasing a level of security when printing image data.

As described above, examples of the data regarding the image include data of an image being displayed at the electronic whiteboard such as the drawing image data, the drawing image data with the watermark data, any presentation material, etc. Other examples of the data regarding the image include data relating to the displayed image such as the watermark data.

Examples of drawings made by the user include, but not limited to, characters, marks, figures, etc., which may be drawn by the user either manually or using any graphics processing tool.

Further, the drawing image data may be captured at a time when a user instruction for sending the drawing image data is received. Alternatively, the drawing image data may be obtained from a local memory of the electronic whiteboard 2. For instance, the user may instruct the electronic whiteboard 2 to send drawing image data, which has been previously stored in a memory or read out from a removable recording medium. In such case, the user may firstly cause the electronic whiteboard 2 to display such image on the display 220 to be shared by a plurality of uses.

Further, the above-described example case assumes that only one user (user A) instructs to send drawing image data for printing. Alternatively, any number of users may instruct the electronic whiteboard 2 to send drawing image data for printing. With detection of the terminal identification information, the electronic whiteboard 2 repeats operation of obtaining a user name, and sending print data with other information regarding the print data to the MFP 9.

Further, the communication system 1 may include more than one MFP 9. In such case, the electronic whiteboard 2 may allow the user to select one of the MFP 9 (or any other device capable of printing) as a destination of print data.

Furthermore, the communication system 1 may further include a print server, which stores the print data management DB 9001 for a plurality of MFPs 9 or any other devices capable of printing. In such case, when an instruction to print is received via the "Print" button 236 without authentication of the IC card 3, the electronic whiteboard 2 requests the user to select a specific MFP 9 for printing, or automatically select a default MFP 9, to print out an image based on the print data, without requiring authentication. When an instruction to print is received with authentication of the IC card 3, the electronic whiteboard 2 sends print data to the print server, with other information regarding the print data for registration to the print data management DB 9001. When the user brings his or her IC card 3 into proximity to a specific MFP 9, the MFP 9 authenticates the user, and when authentication is successful, the MFP 9 requests the print server for one or more print jobs (that is, print data) that have been registered by the user. In response to an instruction to print from the user, the MFP 9 prints an image based on the print data.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A shared terminal, comprising:
   circuitry configured to:
   control a display to display an image to a user of the shared terminal;
   transmit a print request for printing data of the image to a printer via a network;
   determine whether terminal identification information is received from a first terminal of the user; and
   transmit, to the printer in a case that the circuitry determines that the terminal identification information is not received from the first terminal, (i) a first indication that authentication is not to be performed and (ii) a name of the shared terminal as a name of a requester issuing the print request.

2. The shared terminal of claim 1, wherein the circuitry is further configured to
   transmit, to the printer in a case that the circuitry determines that the terminal identification information is received from the first terminal, a second indication that authentication is to be performed.

3. The shared terminal of claim 2, wherein the circuitry is further configured to
   control the display to display a print configuration screen for allowing the user to set one or more print configuration parameters, and
   transmit information regarding set values of the print configuration parameters to the printer via the network.

4. The shared terminal of claim 3, wherein in the case that the circuitry determines that the terminal identification information is not received from the first terminal, the circuitry is further configured to control the display to display the print configuration screen to indicate that the shared terminal is the requester issuing the print request.

5. The shared terminal of claim 2, wherein
the circuitry is further configured to detect whether the first terminal is within a detection proximity of the shared terminal while the image is displayed by the display, and
in a case that the circuitry detects that the first terminal is within the detection proximity, the circuitry receives the terminal identification information.

6. The shared terminal of claim 2, wherein the shared terminal is an electronic whiteboard provided with the display.

7. The shared terminal of claim 2, wherein the second indication indicates that the printer is to perform the authentication prior to printing the data of the image.

8. A system, comprising:
a printer; and
a shared terminal that includes circuitry configured to:
control a display to display an image to a user of the shared terminal;
transmit a print request for printing data of the image to a printer via a network;
determine whether terminal identification information is received from a first terminal of the user; and
transmit, to the printer in a case that the circuitry determines that the terminal identification information is not received from the first terminal, (i) a first indication that authentication is not to be performed and (ii) a name of the shared terminal as a name of a requester issuing the print request.

9. The system of claim 8, wherein the circuitry is further configured to
transmit, to the printer in a case that the circuitry determines that the terminal identification information is received from the first terminal, a second indication that authentication is to be performed.

10. The system of claim 9, wherein the circuitry is further configured to
control the display to display a print configuration screen for allowing the user to set one or more print configuration parameters, and
transmit information regarding set values of the print configuration parameters to the printer via the network.

11. The system of claim 10, wherein in the case that the circuitry determines that the terminal identification information is not received from the first terminal, the circuitry is further configured to control the display to display the print configuration screen to indicate that the shared terminal is the requester issuing the print request.

12. The system of claim 9, wherein
the circuitry is further configured to detect whether the first terminal is within a detection proximity of the shared terminal while the image is displayed by the display, and
in a case that the circuitry detects that the first terminal is within the detection proximity, the circuitry receives the terminal identification information.

13. The system of claim 9, wherein the shared terminal is an electronic whiteboard provided with the display.

14. The system of claim 9, wherein in a case that the printer receives the second indication, the printer is configured to perform the authentication of the user prior to printing the data of the image.

15. A method, comprising:
controlling, by circuitry of a shared terminal, a display to display an image to a user of the shared terminal;
transmitting a print request for printing data of the image to a printer via a network;
determining, by the circuitry, whether terminal identification information is received from a first terminal of the user; and
transmitting, to the printer in a case that the determining indicates that the terminal identification information is not received from the first terminal, (i) a first indication that authentication is not to be performed and (ii) a name of the shared terminal as a name of a requester issuing the print request.

16. The method of claim 15, further comprising:
transmitting, to the printer in a case that the determining indicates that the terminal identification information is received from the first terminal, a second indication that authentication is to be performed.

17. The method of claim 16, further comprising:
controlling the display to display a print configuration screen for allowing the user to set one or more print configuration parameters; and
transmitting information regarding set values of the print configuration parameters to the printer via the network.

18. The method of claim 17, further comprising:
controlling, in the case that the determining indicates that the terminal identification information is not received from the first terminal, the display to display the print configuration screen to indicate that the shared terminal is the requester issuing the print request.

19. The method according to claim 16, further comprising:
detecting whether the first terminal is within a detection proximity of the shared terminal while the image is displayed by the display; and
receiving, in a case that the circuitry detects that the first terminal is within the detection proximity, the terminal identification information.

20. The method according to claim 15, wherein the shared terminal is an electronic whiteboard provided with the display.

* * * * *